(12) United States Patent
Kasower

(10) Patent No.: US 7,689,505 B2
(45) Date of Patent: Mar. 30, 2010

(54) CARD MANAGEMENT SYSTEM AND METHOD

(75) Inventor: Sheldon Kasower, Canoga Park, CA (US)

(73) Assignee: Mighty Net, Inc., Calabasas, CA (US)

( * ) Notice: Subject to any disclaimer, the term of this patent is extended or adjusted under 35 U.S.C. 154(b) by 0 days.

(21) Appl. No.: 12/131,548

(22) Filed: Jun. 2, 2008

(65) Prior Publication Data

US 2008/0255980 A1      Oct. 16, 2008

Related U.S. Application Data

(63) Continuation of application No. 10/393,699, filed on Mar. 21, 2003, now Pat. No. 7,451,113.

(51) Int. Cl.
*G06Q 40/00*     (2006.01)

(52) U.S. Cl. .......................................... 705/38; 705/35

(58) Field of Classification Search ................... 705/35, 705/38
See application file for complete search history.

(56) References Cited

U.S. PATENT DOCUMENTS

| | | | |
|---|---|---|---|
| 5,590,038 | A | 12/1996 | Pitroda |
| 5,640,577 | A | 6/1997 | Scharmer |
| 5,844,218 | A | 12/1998 | Kawan et al. |
| 5,956,693 | A | 9/1999 | Geerlings |
| 6,038,551 | A | 3/2000 | Barlow et al. |
| 6,804,346 | B1 | 10/2004 | Mewhinney |
| 6,910,624 | B1 | 6/2005 | Natsuno |
| 6,985,887 | B1 | 1/2006 | Sunstein et al. |
| 7,529,698 | B2 * | 5/2009 | Joao ............................. 705/30 |
| 2002/0069122 | A1 | 6/2002 | Yun et al. |
| 2002/0128962 | A1 | 9/2002 | Kasower |
| 2002/0169747 | A1 | 11/2002 | Chapman et al. |
| 2003/0009418 | A1 | 1/2003 | Green et al. |

FOREIGN PATENT DOCUMENTS

WO     WO 01/84281 A2     11/2001

OTHER PUBLICATIONS

Ettorre. Paul Kahn on Exceptional Marketing. Management Review, vol. 38(11), Nov. 1994, pp. 48-51.
Ideon, Credit-Card Registry That Bellyflopped this Year, Is Drawing some Bottom-Fishers. The Wall Street Journal, Aug. 21, 1995, p. C2.

* cited by examiner

*Primary Examiner*—Jagdish N Patel
*Assistant Examiner*—Sara Chandler
(74) *Attorney, Agent, or Firm*—Hamre, Schumann, Mueller & Larson, P.C.

(57) ABSTRACT

A method of registering a credit card user's credit card information by a credit card management organization. A card user accesses the card management computer system in a computer network. The method provides a user interface whereby the user grants authorization to the card management organization to obtain the card user's credit report from a credit reporting bureau. The method further transmits a request for the user's credit report to a credit reporting bureau and automatically downloads the user's credit report when received. The method further parses the credit report to determine a card issuer for each card on the credit report using a database of card issuer aliases. The method then fully or partially automatically registers each card with the user's account in the card management association and then presents the opportunity to the user to review and edit each card.

8 Claims, 42 Drawing Sheets

PRIOR ART

FIG. 3

NEW MEMBER REGISTRATION

SIGN UP NOW!
PLEASE PROVIDE THE FOLLOWING INFORMATION SO THAT WE CAN CREATE A PROFILE AND YOU CAN ACCESS YOUR CARD PROTECTION SERVICES.
PLEASE NOTE THAT ALL BOLD FIELDS ARE REQUIRED.

TITLE: [MR. ▼] (MR., MRS., ETC.)
FIRST NAME: [TATYANA]
MIDDLE INITIAL: [ ]
LAST NAME: [ELIZER]
SUFFIX: [ ] (JR., SR., II ETC.)
MARITAL STATUS:
● MARRIED
○ SINGLE
○ DIVORCED
○ SEPARATED
○ WIDOWED

SPOUSE'S FIRST NAME: [KEVIN]
ADDRESS: [18609 GALA STREET]

PRIOR ART
FIG. 5

REGISTRATION CHECK

IN ORDER TO CHECK IF YOU ARE A REGISTERED USER, PLEASE PROVIDE US WITH THE FOLLOWING INFORMATION.

LAST NAME:

MOTHER'S MAIDEN NAME:

EMAIL:

CHECK FOR REGISTRATION     CANCEL

CARD-LINK™ USER ID/PASSWORD CHECK PROCESS
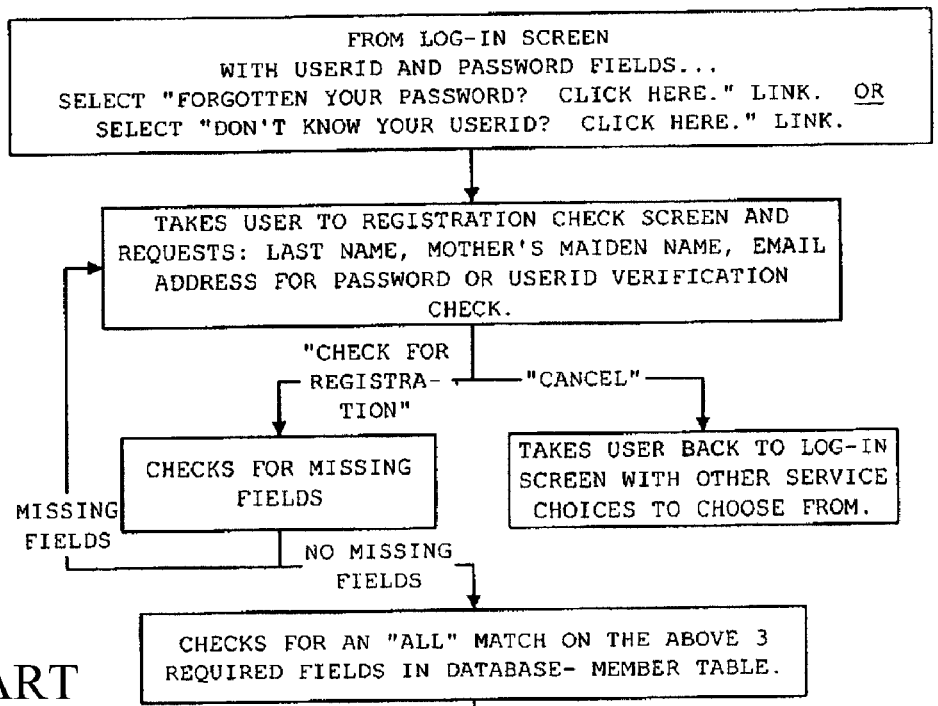
PRIOR ART
FIG. 6
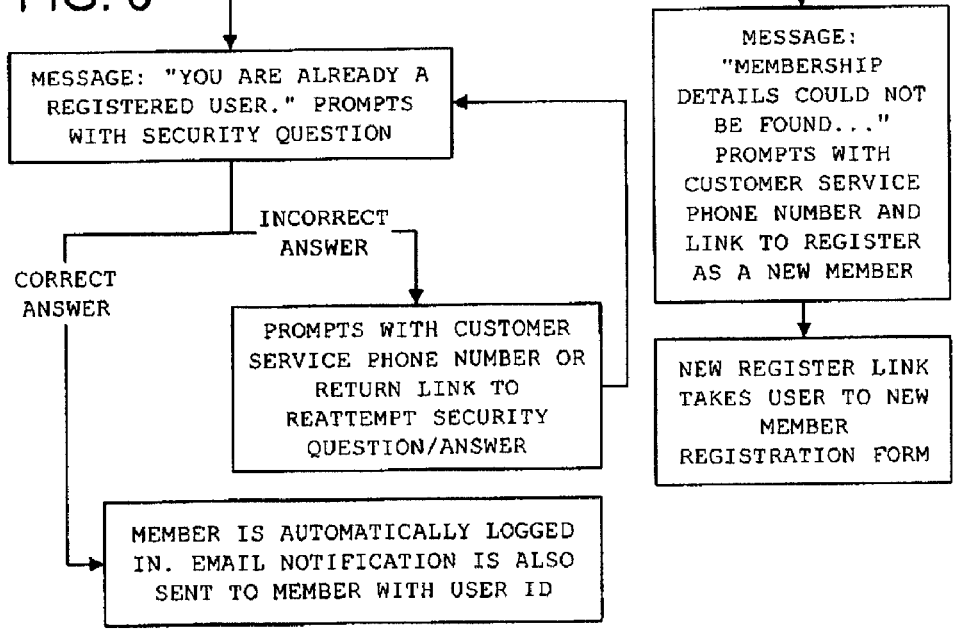

PRIOR ART
FIG. 7

PLEASE LOG IN

PLESE ENTER YOUR USER ID: [ ]   I'M NOT SURE IF I'M REGISTERED USER
PLEASE ENTER YOUR PASSWORD: [ ]   OR NOT. COULD YOU PLEASE CHECK?

DON'T KNOW YOUR USER ID? CLICK HERE.
         [LOG-IN]
                                  FORGOTTEN YOUR PASSWORD? CLICK HERE.

SECURITY & PRIVACY | FAQ | TERMS & CONDITIONS

NOTE: DURING PEAK INTERNET HOURS, YOU MAY EXPERIENCE SLIGHT DELAYS IN UTILIZING THE SERVICES.

PRIOR ART
FIG. 8

WELCOME

PLEASE CHOOSE THE SERVICE YOU REQUIRE :

MEMBER SERVICES
LOST/STOLEN CARD REPORT
ADDRESS CHANGE NOTIFICATION
NEW/REPLACEMENT CARD REQUEST
CHARGE DISPUTE NOTIFICATION
COPY STATEMENT REQUEST
NAME/MARITAL STATUS CHANGE NOTIFICATION
CREDIT INCREASE REQUEST

YOUR INFORMATION
EDIT/VIEW PROFILE
EDIT/VIEW REGISTERED CARDS
REGISTER NEW CARDS
VIEW SERVICES HISTORY

CANCEL SERVICE

LOG OUT

SECURITY & PRIVACY | FAQ | TERMS & CONDITIONS

PRIOR ART
FIG. 10

CANCEL SERVICE

DEXTER & APRIL COLLINS
APRILLE@MIGHTYNET.COM

ARE YOU SURE YOU WISH TO CANCEL YOUR CARD PROTECTION SERVICES?

YES  NO (RETURN TO CARDLINK MENU)

PRIOR ART
FIG. 12

CONNECTION TYPE: (REQUIRED) [SELECT CONNECTION TYPE ▼]

CONNECTION SPEED: (REQUIRED) [SELECT CONNECTION SPEED ▼]

INTERNET SERVICE PROVIDER: (REQUIRED) [                    ]

REQUEST TYPE: (REQUIRED) [▼]

QUESTION, BUG REPORT OR PROBLEM:
(REQUIRED)

PLEASE PRESS ONLY ONCE.
[SUBMIT] [CLEAR]
[PLEASE READ BEFORE SENDING]

CARD-LINK™ CONTACT TECHNICAL SUPPORT

CARD-LINK™ LOG-OUT PROCESS

SESSION VARIABLES/COOKIES ARE ALREADY SET...
SELECT "LOG OUT" AT ANY TIME DURING SESSION FROM MEMBER SERVICES SCREEN.

ONCE SELECTED...

(ALL SESSION VARIABLES ARE CLEARED)

MESSAGE: "YOU ARE NOW LOGGED OUT." ALLOWS OPTION TO RETURN TO THE LOG-IN SCREEN.

REGISTER/EDIT CARDS

DEXTER & APRIL COLLINS
APRILLE@MIGHTYNET.COM

SELECT AN OPTION

- ● ADD A NEW CARD
- ○ VIEW OR EDIT EXISTING CARDS
- ○ DELETE AN EXISTING CARD
- ○ AUTO-REGISTRATION

70

[NEXT]

(RETURN TO CARDLINK MENU)

PRIOR ART
FIG. 19

REQUEST NEW / REPLACEMENT CARD(S)  DEXTER & APRIL COLLINS
APRILLE@MIGHTYNET.COM

PLEASE SELECT THE CARD(S) FOR WHICH YOU ARE REQUESTING A NEW OR REPLACEMENT CARD.

CLICK HERE TO REGISTER A CARD YOU DON'T SEE ON THIS LIST BEFORE CONTINUING.

| CARD | CARD NUMBER | CARDHOLDER |
|---|---|---|
| ☐ SELECT ALL CARDS | | |
| ☐ ABBEY NATIONAL CHEQUE GUARANTEE | | DEXTER LIPTON |
| ☐ BANK OF IRELAND MASTER CARD | 1342515423636356 | R. DEXTER LIPTON |
| ☐ CAHOOT CREDIT CARD | ASD23423421341 2 | DEXTER LIPTON |
| ☐ COSTCO | 4536262736 | APRILLE |

PLEASE SELECT A REASON FOR REQUESTING NEW/REPLACEMENT CARD(S):
● CARD(S) DAMAGED
○ ADDITIONAL CARD(S) REQUIRED
○ OTHER

ENTER THE PERSON WHOSE NAME SHOULD APPEAR ON THESE CARD(S):

[          ]

[ NEXT ]

PRIOR ART
FIG. 21

LOSS REPORT

DEXTER & APRIL COLLINS
APRILLE@MIGHTYNET.COM

PLEASE SELECT THOSE CARDS YOU WISH TO REPORT AS MISSING.

CLICK HERE TO REGISTER A CARD YOU DON'T SEE ON THIS LIST BEFORE CONTINUING.

| CARD | CARD NUMBER | CARDHOLDER |
|---|---|---|
| ☐ SELECT ALL CARDS | | |
| ☐ ABBEY NATIONAL CHEQUE GUARANTEE | 1342 5154 2363 56 | DEXTER LIPTON |
| ☐ BANK OF IRELAND MASTER CARD | ASD2342 3421 3412 | R. DEXTER LIPTON |
| ☐ CAHOOT CREDIT CARD | 4536 26 27 36 | DEXTER LIPTON |
| ☐ COSTCO | 1238 1239 1789 23 | APRILLE |
| ☐ CREDIT LYONNAYS VISA ATM | 1238 1239 1789 23 | DEXTER LIPTON |
| ☐ CREDIT LYONNAYS VISA ATM | 4673 5684 7867 58 | DEXTER LIPTON |
| ☐ DICKENS | 2345 3426 2354 624 | APRILLE COLLINS |
| ☐ FIRST DIRECT VISA | | DEXTER LIPTON |

CARD-LINK™ NOTIFICATION TREE - EXCEPTION

```
PRINT EXCEPTION REPORT FOR MANUAL
            INTERVENTION
```

ADDRESS CHANGE

DEXTER & APRIL COLLINS
APRILLE@MIGHTYNET.COM

PLEASE MAKE THE NECESSARY CHANGES TO YOUR ADDRESS BELOW:

YOUR ADDRESS IS CURRENTLY LISTED AS:

1069 ERRINGER ROAD
SIMI VALLEY P4F 9JO
UK
PHONE:(805) 522-8347  ALTERNATE PHONE:(805) 522-5462

PLEASE ENTER YOUR NEW ADDRESS INFORMATION BELOW:
BOLD FIELDS ARE REQUIRED.

☐ NOTIFY ALL CARD ISSUERS OF ADDRESS CHANGE?

PLEASE NOTE THAT TICKING THIS BOX MEANS YOUR CARD ISSUERS WILL BE NOTIFIED OF THIS ADDRESS CHANGE, EXCEPT THOSE CARDS FOR WHICH YOU REGISTERED AN ALTERNATE BILLING ADDRESS.

PRIOR ART
FIG. 31

DEXTER & APRIL LIPTON
APRILLE@MIGHTYNET.COM

PLEASE SELECT THE CHANGE YOU WISH TO MAKE :

- ● CHANGE NAME
- ○ CHANGE MARITAL STATUS

NEXT (RETURN TO CARDLINK MENU)

PRIOR ART
FIG. 33

CREDIT LIMIT INCREASE REQUEST
DEXTER & APRIL COLLINS
APRILLE@MIGHTYNET.COM

PLEASE SELECT THE CARD FROM WHICH YOU WISH TO REQUEST A CREDIT LIMIT INCREASE.

CLICK HERE TO REGISTER A CARD YOU DON'T SEE ON THIS LIST BEFORE CONTINUING.

| CARD | CARD NUMBER | CARDHOLDER |
|---|---|---|
| ○ ABBEY NATIONAL CHEQUE GUARANTEE | 189273897 | DEXTER LIPTON |
| ○ APRILLES AL VISA DEBIT | 12312019823 019283 | APRIL M. COLLINS |
| ○ APRILLES VISA | 0897123498134 | APRILLE M. COLLINS |
| ○ ARDING HOBBS | 98327948234 | MR. MRS. LIPTON |
| ○ THE ASSOCIATES VISA | 98327948234 | DEXTER LIPTON |
| ○ THE ASSOCIATES VISA | | |

[NEXT]

PRIOR ART
FIG. 35

| CHARGE DISPUTE | | DEXTER & APRIL LIPTON |
| --- | --- | --- |
| | | APRILLE@MIGHTYNET.COM |

PLEASE SELECT THE CARD AGAINST WHICH YOU WISH TO DISPUTE CHARGES.

CLICK HERE TO REGISTER A CARD YOU DON'T SEE ON THIS LIST BEFORE CONTINUING, OR
CLICK HERE TO REGISTER A CHANGE DISPUTE AGAINST A LOST, STOLEN OR PREVIOUSLY DELETED CARD.

CURRENT CARDS

| CARD | CARD NUMBER | CARDHOLDER |
| --- | --- | --- |
| ○ ABBEY NATIONAL CHEQUE GUARANTEE | | |
| ○ APRILLES AL VISA DEBIT | 189273897 | DEXTER LIPTON |
| ○ APRILLES VISA | 12312 019823 019283 | APRIL M. COLLINS |
| ○ ARDING HOBBS | 08971234981134 | APRILLE M. COLLINS |
| ○ BANK OF IRELAND MASTERCARD | 134215423635356 | MR. MRS. LIPTON |
| ○ CAHOOT CREDIT CARD | ASD23423421342 | R. DEXTER LIPTON |
| | | DEXTER LIPTON |

[NEXT]

(RETURN TO CARDLINK MENU)

PRIOR ART
*FIG. 36*

COPY STATEMENT REQUEST
DEXTER & APRIL LIPTON
APRILLE@MIGHTYNET.COM

PLEASE SELECT THE CARD FOR WHICH YOU WISH TO HAVE A COPY STATEMENT.

PLEASE NOTE: SOME ISSUERS MAY MAKE A CHARGE FOR COPY STATEMENTS.

<u>CLICK HERE TO REGISTER A CARD YOU DON'T SEE ON THIS LIST BEFORE CONTINUING.</u>

| | CARD | CARD NUMBER | CARDHOLDER |
|---|---|---|---|
| O | ABBEY NATIONAL CHEQUE GUARANTEE | 189273897 | DEXTER LIPTON |
| O | APRILLES AL VISA DEBIT | 12312 019823 019283 | APRIL M. COLLINS |
| O | APRILLES VISA | 0897123498134 | APRILLE M. COLLINS |
| O | ARDING HOBBS | | MR. MRS. LIPTON |
| O | BANK OF IRELAND MASTERCARD | 13425154236356 | R. DEXTER LIPTON |

[NEXT]

(RETURN TO CARDLINK MENU)

FIGURE 39

Thank you for requesting automatic card registration. However, it appears that you have recently requested this service on <INSERT DATE>.

If you still wish to continue with automatic card registration, please choose the "Continue" button, below.

CANCEL    CONTINUE

FIGURE 40

In order to complete your request for automatic card registration, we will require your permission to obtain a copy of your credit file from <<CREDIT BUREAU>>. Your current credit cards will be identified from this file in order to automatically register them.

Full Name: _____
SSN: _____
Date of Birth: _____
Current Address: _____
Previous Address: _____

[CANCEL]   [CONTINUE]

FIGURE 41

Thank you.

The automatic registration of your credit cards is currently being performed. You will be notified via email at <<EMAIL>> as soon as the process is complete (usually within 15 minutes).

FIGURE 42

Your automatic card registration is complete.

To view the results, please choose the "Continue" button, below.

CANCEL        CONTINUE

CARD MANAGEMENT SYSTEM AND METHOD

PRIORITY INFORMATION

The present application is a Continuing Application of U.S. application Ser. No. 10/393,699 entitled "CARD MANAGEMENT SYSTEM AND METHOD," filed Mar. 21, 2003, which is herewith incorporated by reference in its entirety.

FIELD OF INVENTION

The present invention generally relates to a credit card management system, and more particularly to an on-line card management system accessible via a computer network, such as the Internet.

BACKGROUND OF THE INVENTION

The explosion in the use of multiple credit and charge cards in the late 1960s created the need for card protection. At the time, this need could be efficiently filled with 1960s enabling technology (e.g., minicomputer) and efficient communications (e.g., toll-free calls, telex, etc.). The demand for a "one call does it all" service for communicating with multiple card issuers for the purpose of limiting liability, reporting lost or stolen cards or changes of address made sales easy. Today, there has been a great explosion in the number and type of cards per household. Such cards include credit cards, charge cards, debit cards, ID cards, medical insurance cards, library cards, automobile club cards, discount cards, and membership cards.

The principle prior art method of reporting a change of address, requesting a new card, notification of a billing dispute, requesting a copy of a bill, reporting a change in marital status, reporting a lost or stolen card, or requesting an increase in credit line, required a phone call or written notification to the card issuer. This often required the cardholder to spend a substantial amount of time thereafter on "hold" until a service representative became available or navigating through an automated voice response system. The cardholder could also subscribe to a lost or stolen card service. Here the cardholder was required to submit a list of the cards and the associated data thereto by mail. Thus a significant amount of time could pass before protection was obtained. If a card was lost or stolen, the cardholder was required to telephone the service. Of course, any change in a card or the addition of a card required an additional letter.

U.S. patent application Ser. No. 09/846,616 entitled Card Management System And Method Therefore, by S. Kasower, filed May 1, 2001 discloses a method and system for on-line card management, wherein the card is issued to a card user by an issuing organization. The card user then interfaces with a card management organization via the card user's own computer through the Internet system to a computer system within the management organization. The computer system includes a computer program that processes the card user's request(s) concerning the cards(s) and the car issuer is informed of the car user's request via the Internet system. The computer program thereafter informs the card user that the card issuer has been informed. While the card management system provides all the needs of a card user, it does require that the user manually enter the credit card.

Thus it is a primary object of the invention to provide an improved card management method and system that harnesses modern communications and information technology to each and every card that a card user might carry.

It is another primary object of the invention to provide an improved card management method and system to extend card protection services to meet current cardholder expectations.

It is a further object of the invention to provide an improved card management method and system wherein the cardholder can conduct a multitude of transactions in a single connection to the Internet.

It is another object of the invention to provide an improved card management method and system to provide on-line card registration.

It is another object of the invention to provide an improved card management method and system that can instantly notify the card issuer of a lost or stolen card.

It is a still further object of the invention to provide a simplified method of providing credit card information to an entity such as a card management organization.

It is another object of the invention to integrate a simplified method of providing credit card information to a credit card management organization.

It is another object of the invention to provide a simplified method of providing credit card information to an entity such as a card management organization that only requires the card user to grant permission to card management organization to allow the organization to obtain necessary information.

SUMMARY OF THE INVENTION

The invention is a method of the obtaining a credit card user's credit card information on-line by a credit card management organization. In detail, the card user accesses a card management computer system in a computer network and provides the card management organization with authorization to obtain the card user's credit report from a credit reporting bureau. The card management organization requests the credit report from the bureau by means of the computer network. The card management organization extracts the required credit card data from the credit report transmitted by the credit bureau, loops through the extracted credit card data and attempts to match the credit card data to existing credit card issuers using the card management organization's internal proprietary algorithm and data base of card issuer's "aliases." The card management organization's computer checks the accuracy of the matched credit card data with the card user, and stores the verified and checked credit card data in the card management organization's computer system.

It should be appreciated that the card management system of the present invention is suitable for use in connection with a wide variety of cards, including but not limited to: credit cards, charge cards, ATM/debit cards and the like. In fact, any sort card that would appear on a credit report issued by a credit bureau can be automatically registered by the system and method described herein.

The invention has application to Applicant's co-pending patent application Ser. No. 09/846,616 entitled Card Management System and Method Therefore, by S. Kasower, filed May 1, 2001. The system, in a broad sense, is an on-line card management system, wherein the card is issued by a issuing organization, and includes: a computer system accessible via a computer network, the computer system having a selection program for selecting at least one of a plurality of card management services; an input program for inputting data associated with the selected card management service; and a program providing the data associated with a selected card management services to the issuing organization.

The method of the '616 application includes the steps of: accessing a card management computer system in a computer network; selecting at least one of a plurality of card management services provided by the computer system; inputting data associated with the selected card management service; and providing the associated data to the issuing organization.

Such card management services include registering at least one card by inputting associated card data, change of address, reporting a lost or stolen card, request for a new card, notification of a billing dispute, request for a copy of a bill, a change in marital status or name change and a request for an increase in credit line. Furthermore, a record of the associated data is maintained as well as providing a confirmation that the issuing organization has been contacted and provided the associated card data.

However, this prior invention required the card holder to use his or her personal computer terminal to contact the computer system via the internet and to manually enter the credit card information. It is therefore clear that the use of the method claimed herein used with this existing card management system greatly improves the performance thereof.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF FIGURES

FIG. 3 a simplified view of the "new member registration" screen.

FIG. 5 is a simplified view of the "registration check" screen.

FIG. 6 present a flow chart of the computer program for "user identification and password check" service"

FIG. 7 is a simplified view of the "logging in" screen.

FIG. 8 is a simplified view of the screen for "selection of member services."

FIG. 10 is a simplified view of the screen for "canceling services."

FIG. 12 is a simplified view of a screen for "obtaining technical support" services.

FIG. 14 is a flow chart of the computer program for "logging out."

FIG. 15 is a view of the screen for "manually registering/editing/automatic registering cards."

FIG. 19 is a screen for "requesting a new or replacement cards when the card is already registered."

FIG. 21 is a screen for reporting a lost card.

FIG. 27 is a continuation of the flow chart illustrated in FIG. 23.

FIG. 29 is the screen for reporting an "address change."

FIG. 31 is the screen for reporting a "change in name and or a change in marital status" services.

FIG. 33 is the screen for "requesting a credit increase for a credit card."

FIG. 35 is the screen for reporting a "charge dispute" made on a credit card.

FIG. 36 is the screen for "ordering a copy of a statement."

FIG. 39 is a typical screen for informing the individual user that they have recently requested automatic registration of credit cards.

FIG. 40 is a typical screen for authorization to obtain the credit report of the individual card user.

FIG. 41 is a screen for informing the individual user that the automatic registration procedure has been started and that results will be provided shortly.

FIG. 42 is a screen for informing the individual user automatic registration has been completed.

DETAILED DESCRIPTION OF THE PREFERRED EMBODIMENT

Set forth below is an overview of a preferred embodiment of the present invention. It should be appreciated that, while a preferred embodiment of the present invention is described in connection with the Internet, the present invention is suitable for use in connection with other computer networks. Moreover, the method of card management of the present invention may be directly accessible, or accessible via a private computer network. In the following discussion of the invention, selected computer screens are used for purposes of illustration, but it will be obvious that additional screens are used, but not disclosed nor need they be for purposes of understanding the invention. However, it is first necessary to discuss the Ser. No. 09/846,616 system in detail.

Figure 1:
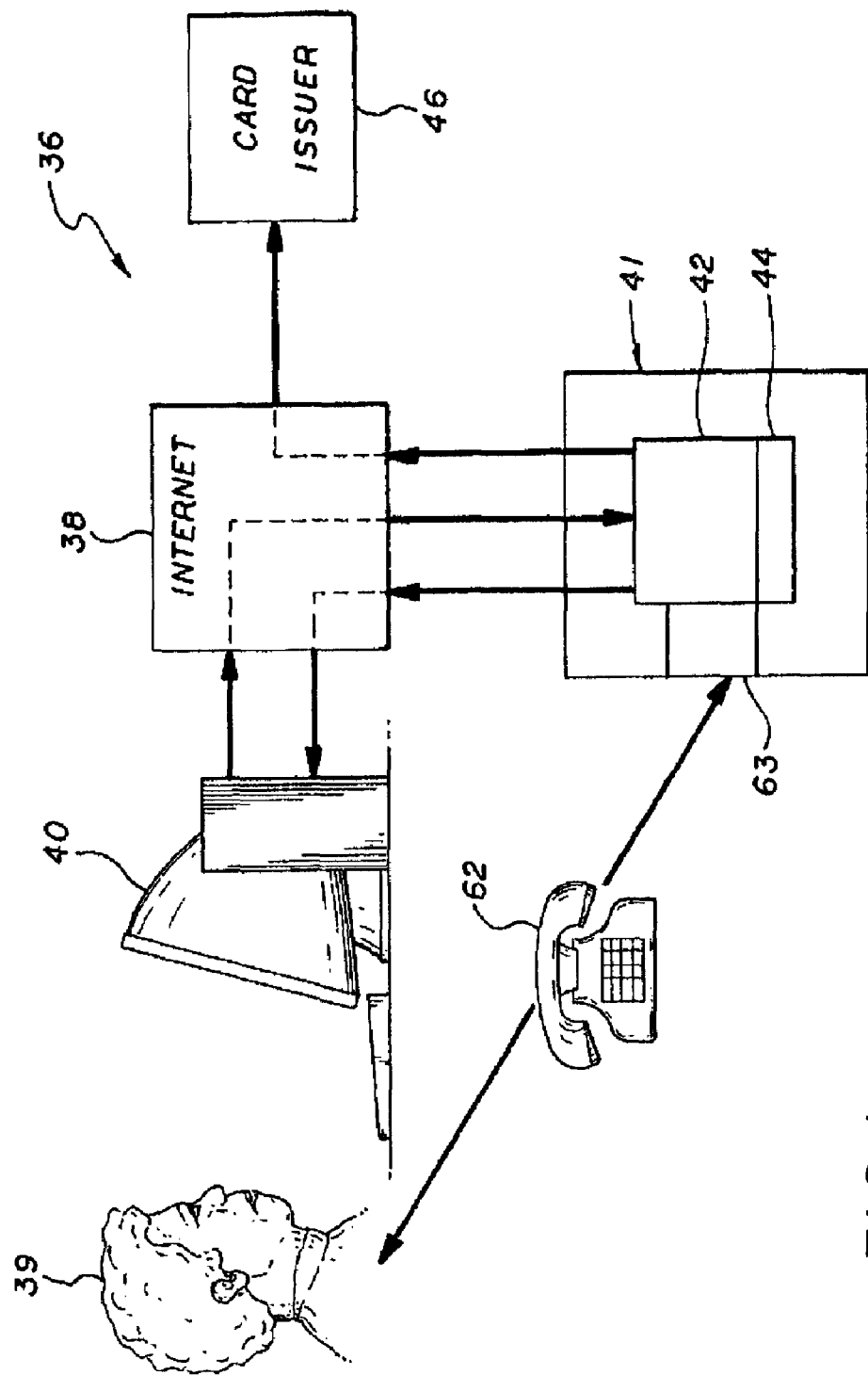
FIG. 1 is a simplified schematic of the card management system.

As illustrated FIG. 1, the prior art card management system, generally indicated by numeral 36, uses the Internet system 38 to interface with the individual card holder 39 via the individual's computer 40 and the card management organization 41. The card management organization 41 includes computers 42 having a card management computer program 44 therein which process data concerning the cards and provides associated card data to the card issuer 46 also via the Internet system 38. Provisions are provided for non-internet communication with the card user and the card issuer, as will be subsequently discussed.

Figure 2:
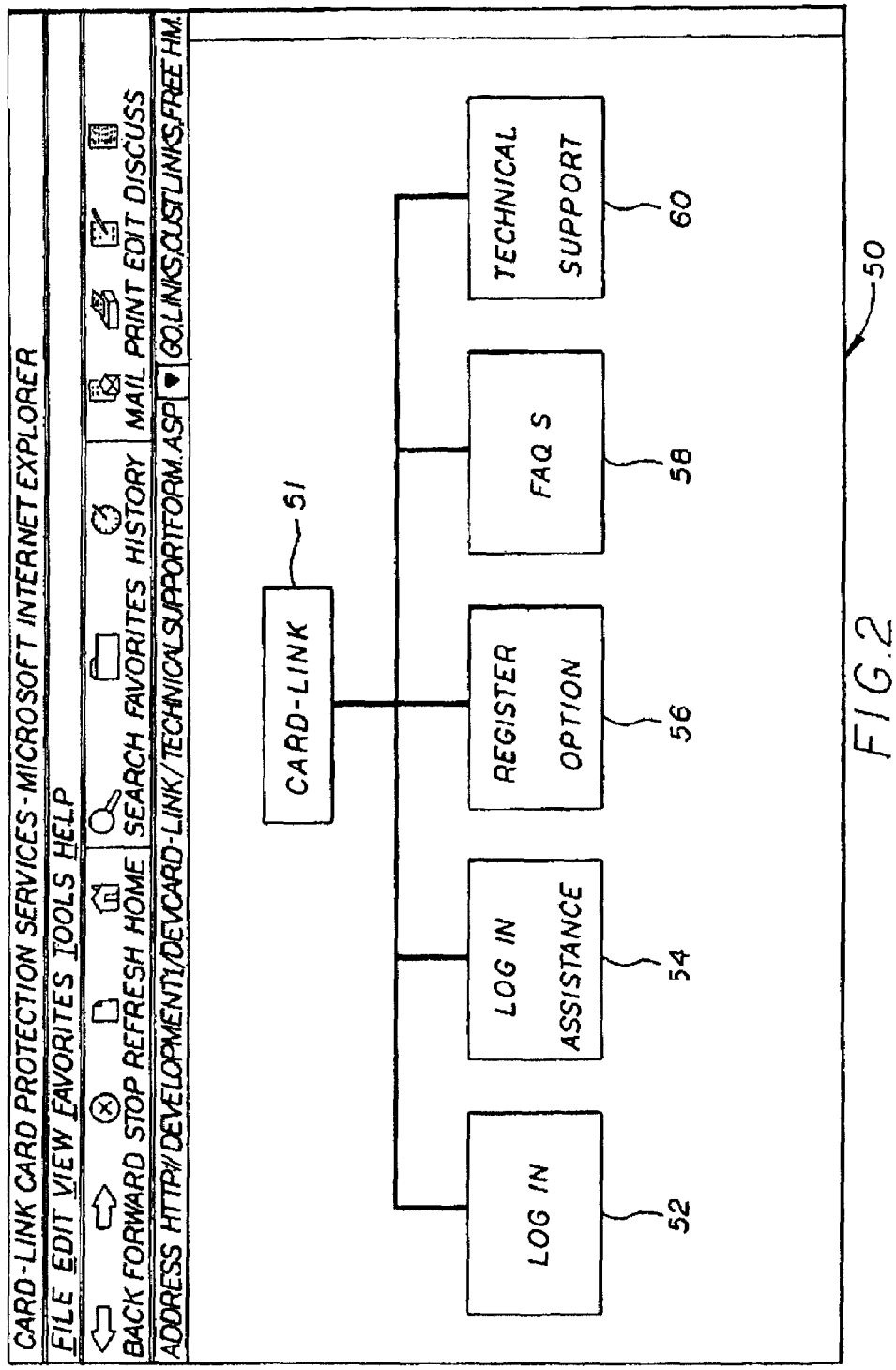
FIG. 2 is a view of the "site entry" screen.

As illustrated in FIG. 2, when the cardholder or user "pulls up" the main screen, generally indicated by numeral 50, it is either generic (if accessed directly) or customized (if accessed via a sponsor). The main screen includes a series of links: a log in option 52 to enter the user ID and password for the purpose of logging in, log in assistance link 54 for the customer who is not sure he is a member, or who has forgotten either his User ID or Password; registering link 56, frequently asked questions link 58 and technical support link 60

Figure 4:
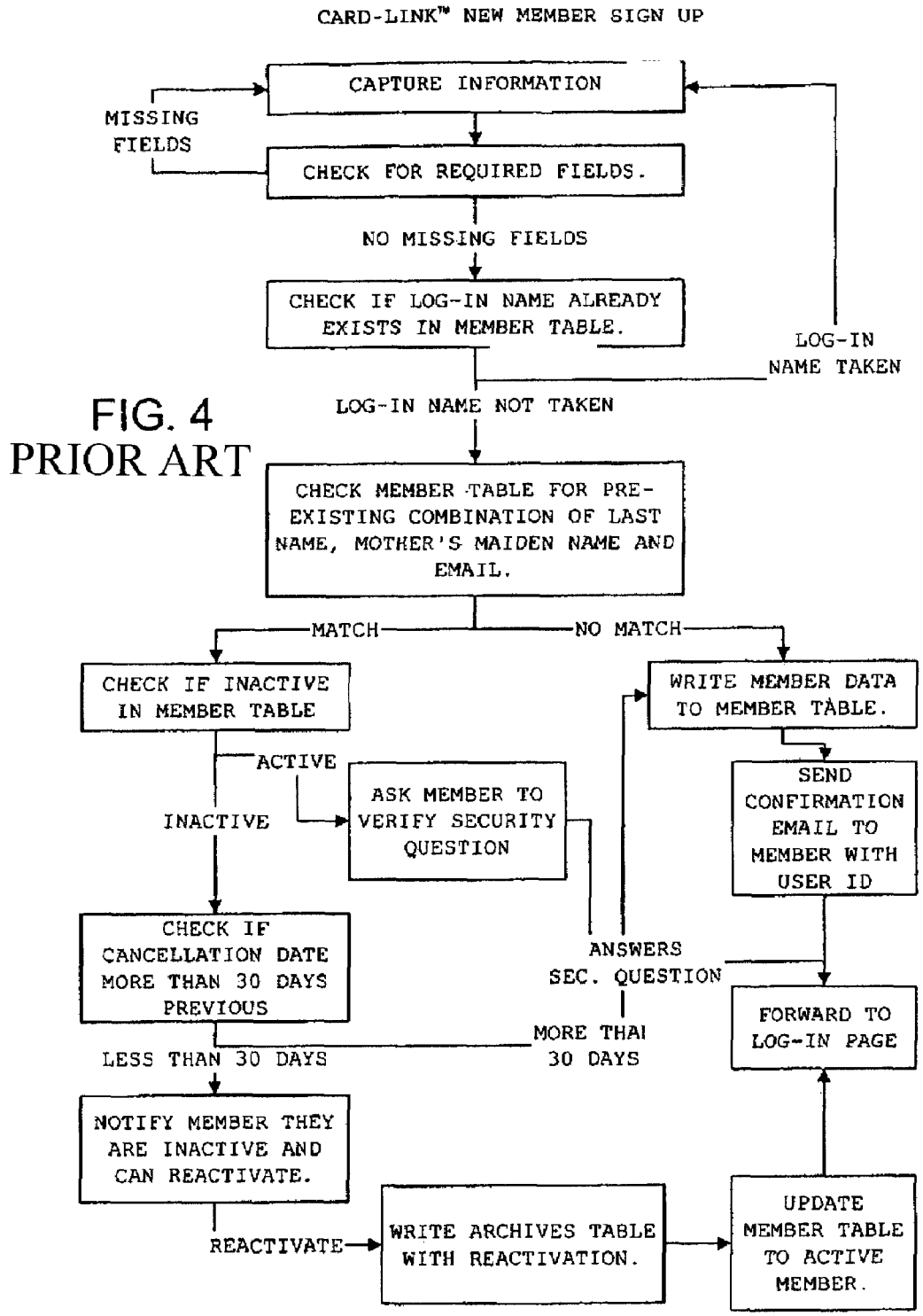
FIG. 4 present a flow chart of the computer program for "new member registration" services.

If the cardholder is not a member and wishes to register, the individual may "click" on the Register Option 56 and will pull up the Registration Screen as shown in FIG. 3. The computer program for the registration process is presented in the flow chart as illustrated in FIG. 4. The individual will be guided through the registration process and will be requested to provide the specified information in the flow chart. At the end of the process, the individual will be registered and have a personalized user identification and password. The individual can then return to the main menu screen (FIG. 2).

Upon return to the main menu screen (FIG. 2), the individual may want to learn more about the card management system by clicking on the Frequently Asked Questions Option 58. This will bring the individual to a screen wherein most frequently asked questions are presented with answer. Following are examples:

Q: Why should I register?

A: Managing a wallet full of cards is a major responsibility! Registering takes the hassle out of managing your cards. It's easy to maintain your card list on-line, and communication with a card issuer becomes almost effortless with the click of a mouse.

Q: Which cards may I register?

A: All of your cards! That includes credit and debit cards, ID cards, membership cards, insurance cards . . . virtually any card you carry in your wallet.

Q: Must I pre-register my cards?

A: No. Although it may be more convenient to pre-register your cards, you may register cards at the time service is requested.

Q: What if I register a card you have not heard of?

A: In that event, we will ask you for some basic details about the card issuer when the card is registered. Cards are our business, so we don't expect this to be a common occurrence.

Q: May I register cards of my spouse or other family members?

A: Certainly! A place is provided for you to enter an alternate cardholder name for any card registered.

Q: May I register business cards that go to a different address?

A: Yes. A place is provided for you to enter an alternate address for any card registered.

Q: If I have informed my card issuers directly of a loss or change of address, will they notify you?

A: No. Card issuers will not notify Card-Link of reports or changes you make directly with them.

Q: Will you keep a record of the different times I use your service?

A: Yes. We will keep an archive of your use of the service for a minimum of two years and you can view that service record at any time.

Q: Can my partner or spouse have their own membership?

A: Yes, but they will have to register as a separate member and pay their own fee as defined by your bank.

Q: How quickly will my cards be replaced after I have reported their loss?

A: The re-issue of cards is in the hands of the issuer and whilst they all take immediate notice of the loss reports, the speed at which they send out new cards will vary from 24 hours to 10 days.

Q: How can I get my lost cards replaced more quickly?

A: While we can report all your cards lost, we cannot influence the response of your card issuers. If you need a replacement in a hurry we suggest that, after having reported all your cards, you speak directly to the card issuer from whom you need the urgent card replacement.

Q: How secure is your website?

A: We take security of your data seriously. We use Secure Socket Layers (SSL, the industry standard) and the best software and hardware security solutions available today. All of your personal information—including name, address and card numbers—is encrypted so that information cannot be read as it travels over the Internet. Frankly, your information is more secure on our secure server than it is in a typical office environment.

Q: How do you ensure no one else has access to my information?

A: In addition to having state-of-the-art software and hardware to protect the data registered with us (see previous question), your file is password protected. You alone have control over your password, and can change it as often as you like.

Q: Is there any way I can know for sure my information is encrypted?

A: Your browser will tell you. Both Netscape and Internet Explorer browsers display an icon at the bottom of the screen indicating that you are at a secure site.

Q: How do you notify card issuers?

A: Card issuers are notified via e-mail, fax, telex, phone or letter. Many times one method is preferred by a particular card issuer.

Q: What is the liability for fraudulent use of a credit card?

A: Liability is limited under the Consumer Credit Act to $50. This limit does not apply if the cardholder acts fraudulently or with gross negligence, including disclosure of the cardholder's PIN number.

If the individual is not sure he is a registered member, he or she can click on Log In Assistance 54 in FIG. 2, which will bring a separate screen shown in FIG. 5 and will be guided through a check procedure as set forth in the flow chart in FIG. 6. Note that, if at the end of the process the individual is found to already be a member, he or she is brought back to the Main menu (FIG. 2). Upon clicking on the Log in Option 52, the individual will learn whether he or she is already logged in. If not found to be registered, the individual is brought to the Registration Screen (FIG. 3).

If the individual is already a member or has just become a member and knows the pin number, the individual can click on the Log In Option 52 (FIG. 2) which will bring up the Log in screen as shown in FIG. 7. Upon logging in, the Member Services menu as illustrated in FIG. 8 will appear. This allows the individual to access the services offered:

Report Lost/Stolen Card(s)

Address Change

Request New/Replacement Card(s)

Charge Dispute

Figure 9:
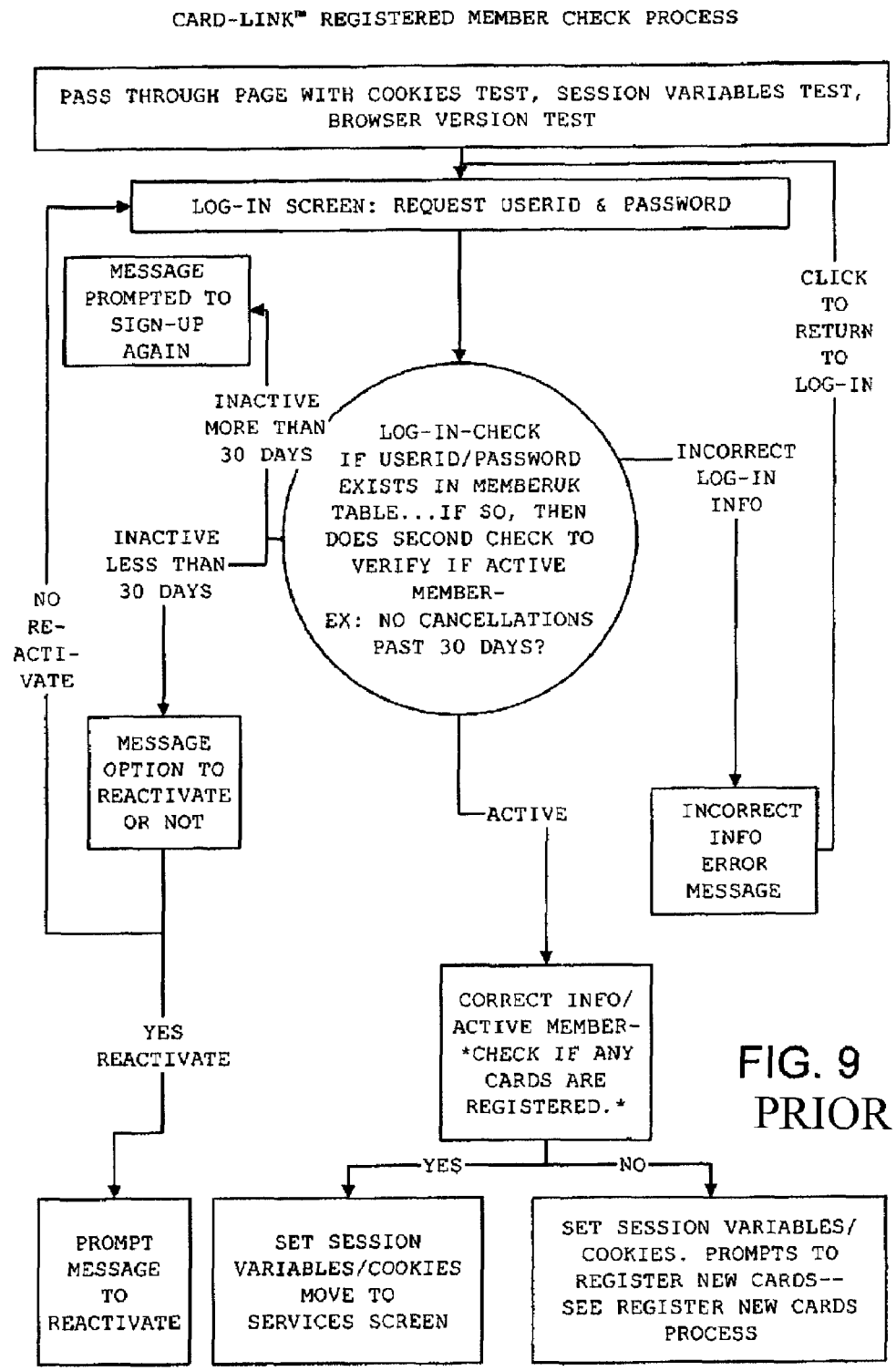
FIG. 9 present a flow chart of the computer program for "check-in."

Request Copy of Statement
Report Change of Marital Status/Name
Request Increased Credit Limit All these steps are illustrated in the computer flow chart illustrated in FIG. 9.

Figure 11:
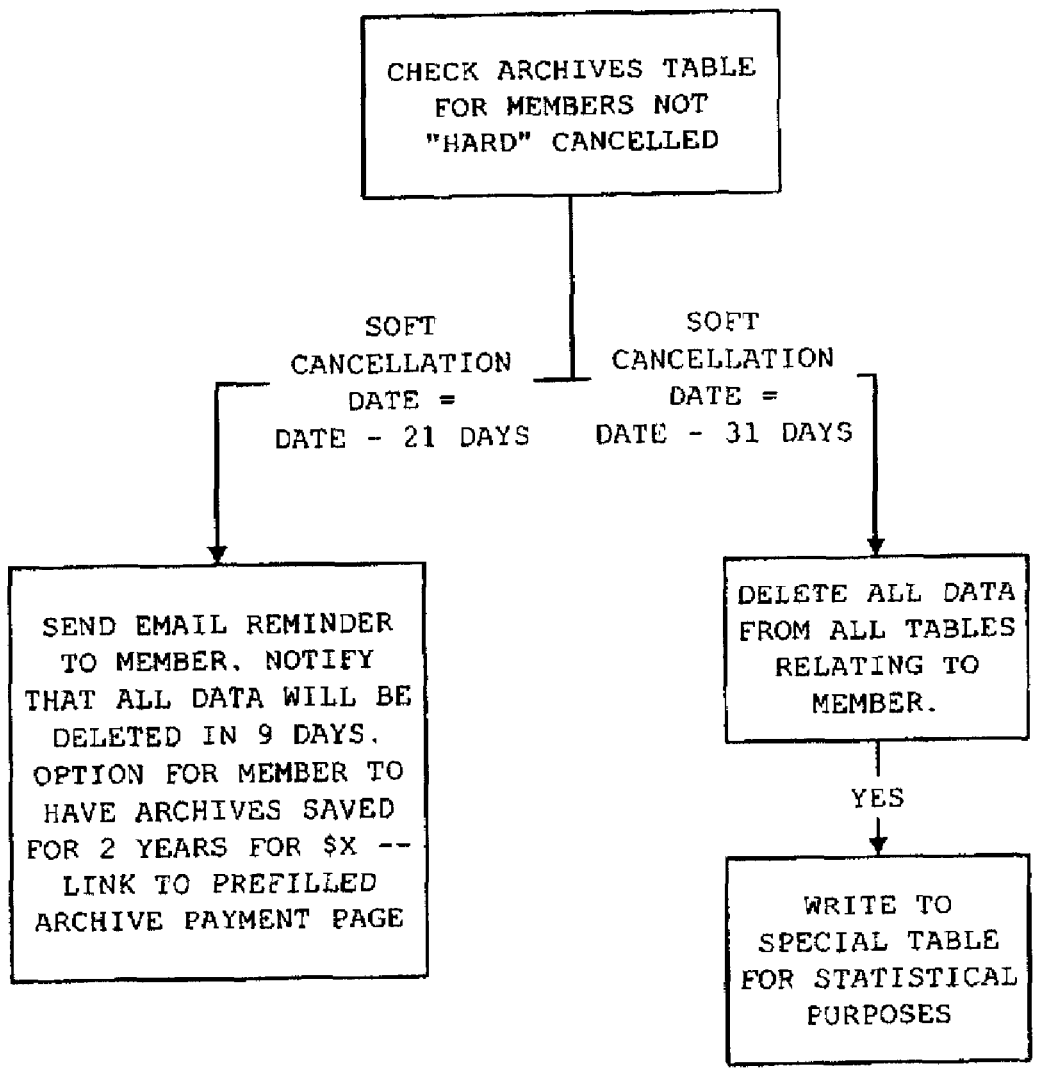
FIG. 11 is a flow chart for the computer program to "cancel services."
Figure 13:
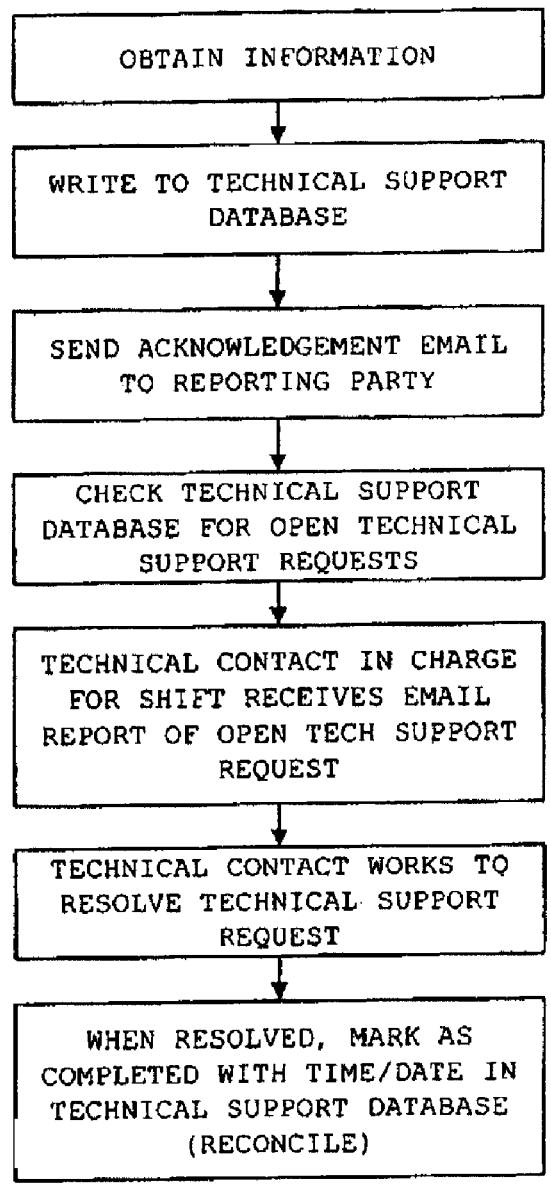
FIG. 13 is a flow chart of the computer program for "obtaining technical support" services.

The Member Services menu further includes an option to cancel the service and the program as disclosed in FIG. 10 with the associated computer flow chart illustrated in FIG. 11. Note that confirmation is provided. The Member Services menu also includes an option to contact Technical Support as indicated in Technical Support menu (FIG. 12) and the computer flow chart as illustrated in FIG. 13. The individual is provided with capability to indicate the type of problem and provide details thereof. The provider can then analyze the problem and correct it and contacts the individual by e-mail. Of course, a Log out Option is provided and is illustrated in the computer flow chart provided in FIG. 14.

Figure 16:
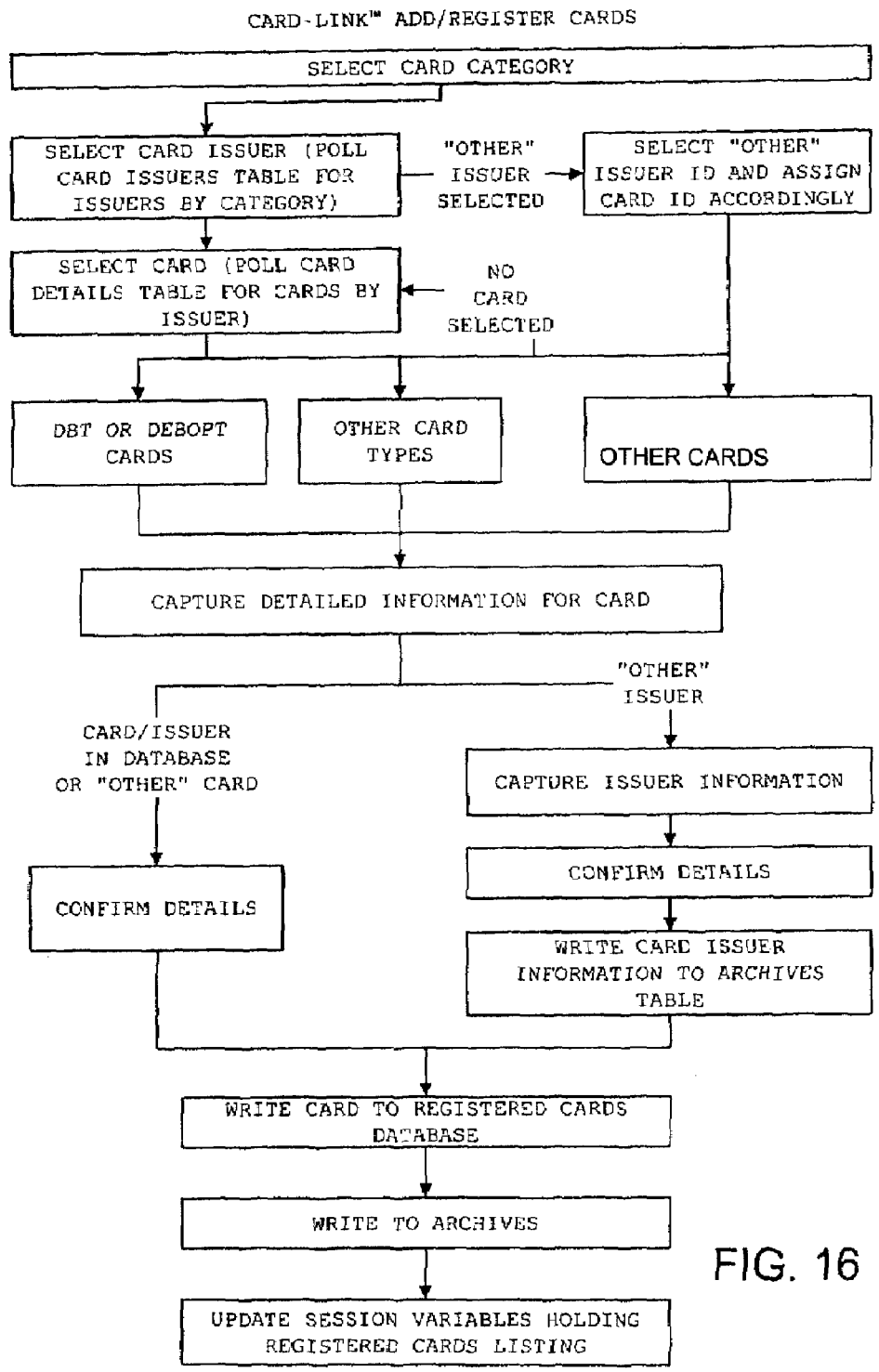
FIG. 16 is a flow chart for a computer program for "adding and registering cards" services.
Figure 17:
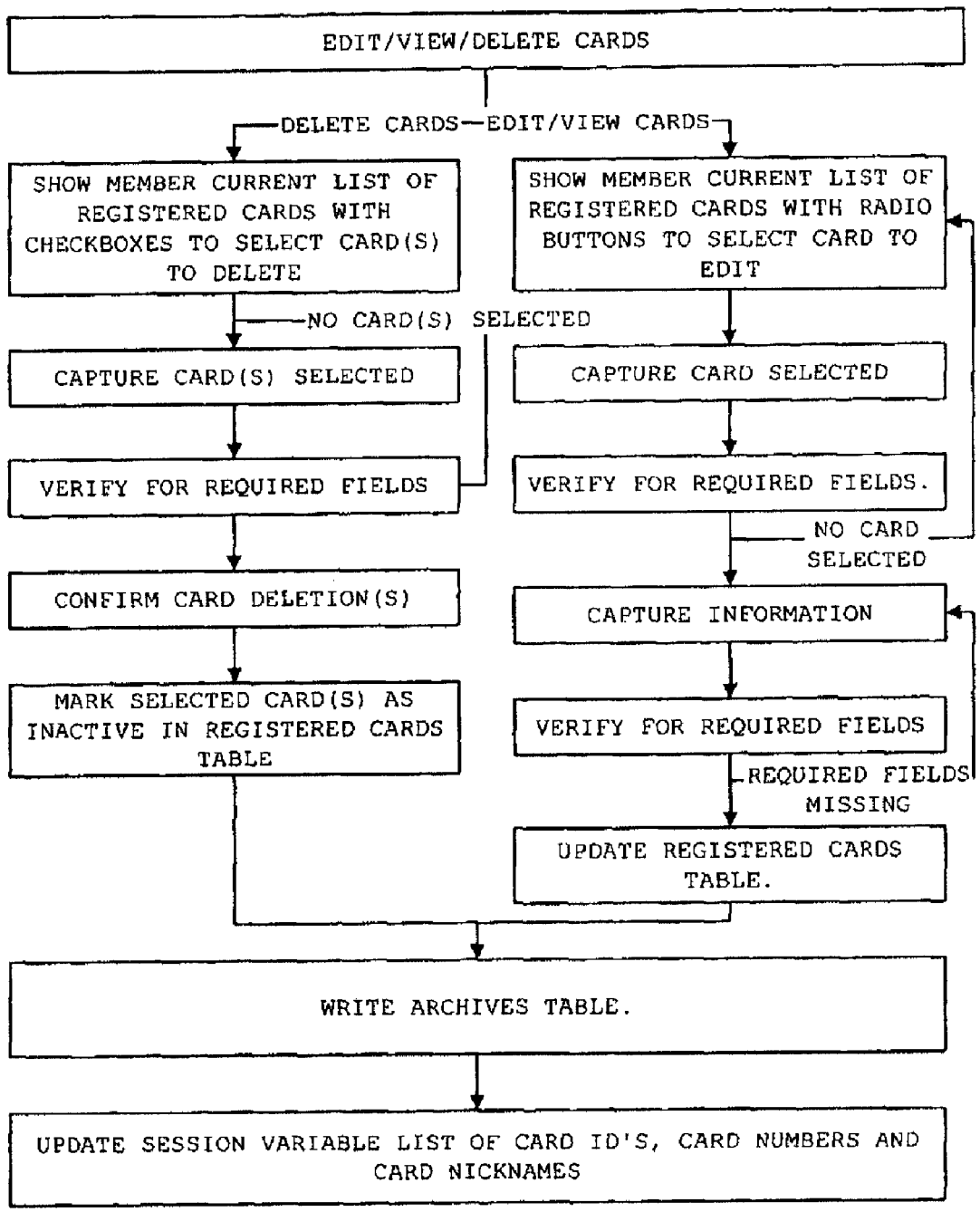
FIG. 17 is a flow chart for a computer program for "editing and viewing and deleting cards" services.
Figure 18:
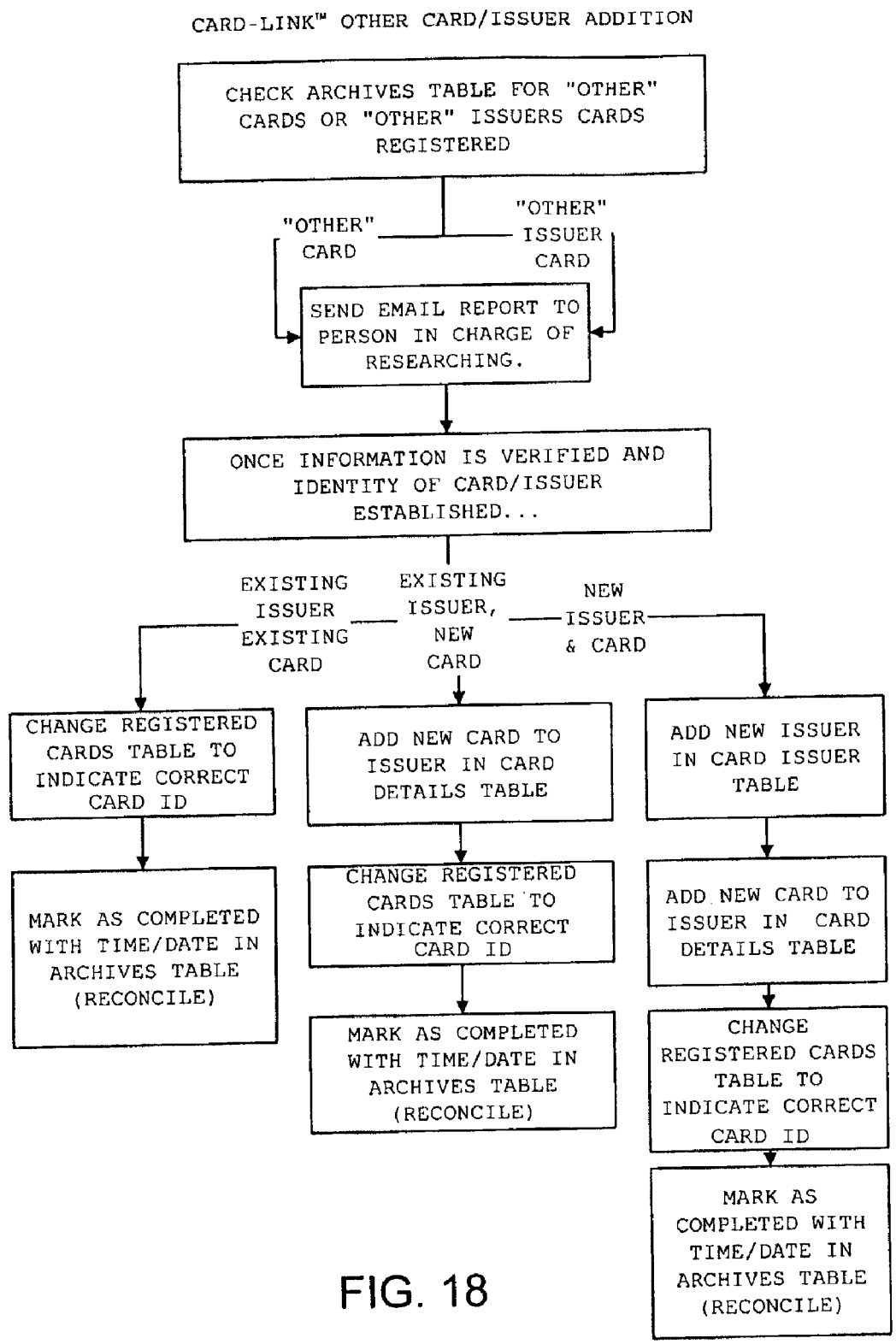
FIG. 18 is a flow chart for a computer program for "adding cards from unlisted issuers" services.

Still referring to the Member Services menu in FIG. 8 and additionally, to the Register/Edit Cards menu in FIG. 15, the flow chart for the computer program to add/register cards is illustrated in FIG. 16, while the edit/view/delete computer flow chart is illustrated in FIG. 17. Thus new cards can be added, the existing cards can be viewed and edited, and cards can be deleted. The individual is prompted to select a category of card to be added: bank, retail, membership or other. The individual is then prompted to select the card issuer from a list of cards within the program directory, or enter the name if the card is not found on the list. If issuer or card is not known, the individual will be prompted to provide issuer or card details, such as the card number, account number and sort code, etc. The individual is also prompted to enter an alternate name for the card chosen, if desired, as well as alternate billing information, if applicable. To delete cards, the individual is presented with a list of previously registered cards, and prompted to select the card(s) to be deleted. For convenience, a list is provided of the most prominent issuers and cards. If not in the list in the program directory, the individual may enter information relevant to the new card (noted as "other cards" in the flow chart in FIG. 18).

Figure 20:
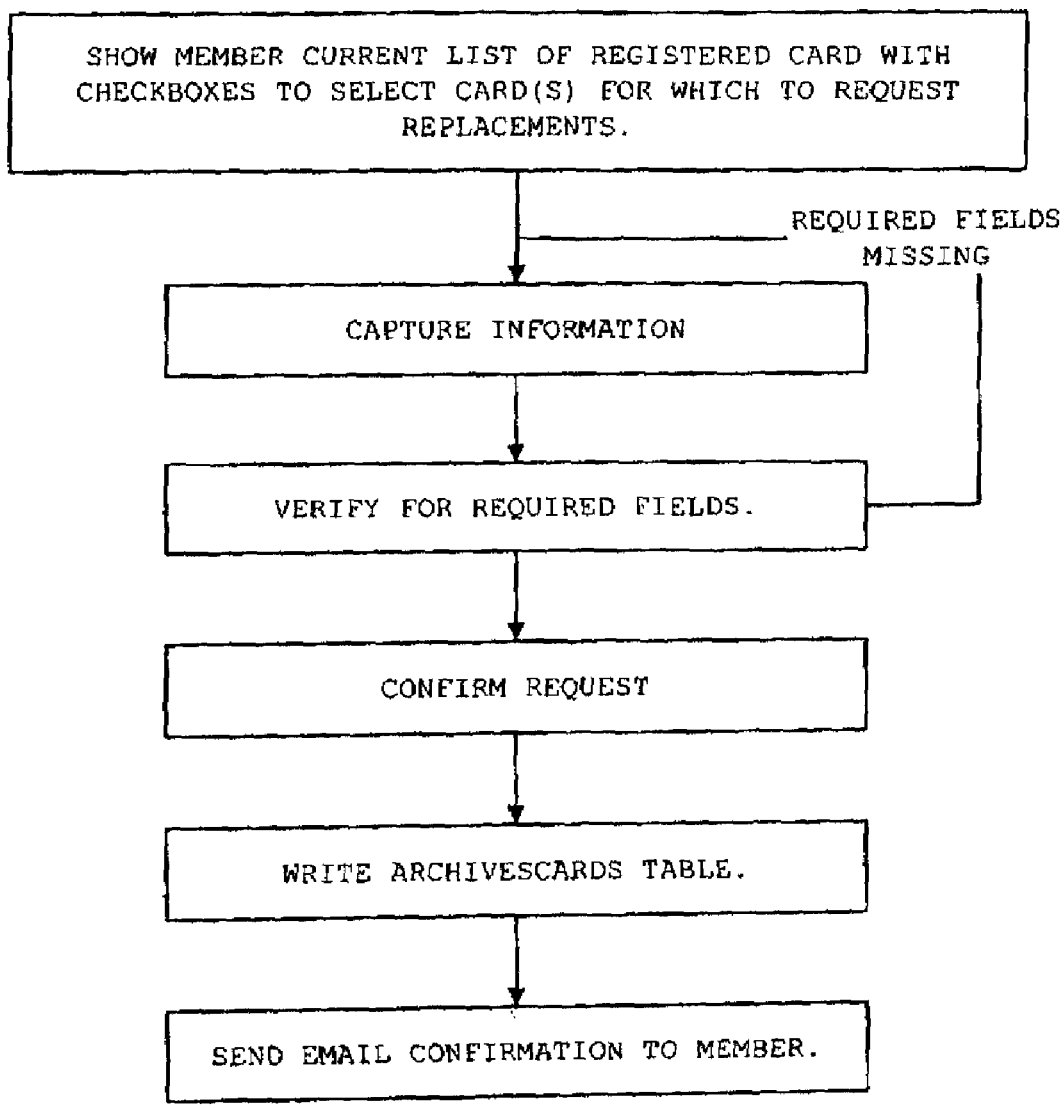
FIG. 20 is a flow chart for the computer program for "requesting new or replacement card that is already registered" services.

Referring to FIG. 8 and additionally to FIG. 19, which is the Request New/Replacement Option menu screen for cards that are listed on the menu and to FIG. 20, which is flow chart of a computer program therefore, reasons for requesting the new/replacement cards can be entered, as well as the name of the individual that should appear on the card. Confirmation is provided to the individual card user.

Still referring to FIG. 8 and to FIG. 21, which is the Lost Report Option menu, and additionally to the flow charts for the computer program illustrated in FIGS. 22 to 27, after selecting the reporting option on the Member Services menu screen, the Reporting Option menu screen, FIG. 21, appears. The individual is prompted to select the card(s) that are missing, after first adding any missing cards to the list of registered cards. In subsequent screens, the individual is also prompted to provide details concerning the loss, then submits a lost report. Details include:

Whether the cards are lost or stolen;
Where the loss occurred;
Date loss occurred (or date user discovered cards missing);
Temporary phone numbers where user can be reached during next 48 hours;
Police report number, if any;
Notes about loss; and
Whether or not replacement cards are required.

Figure 22:
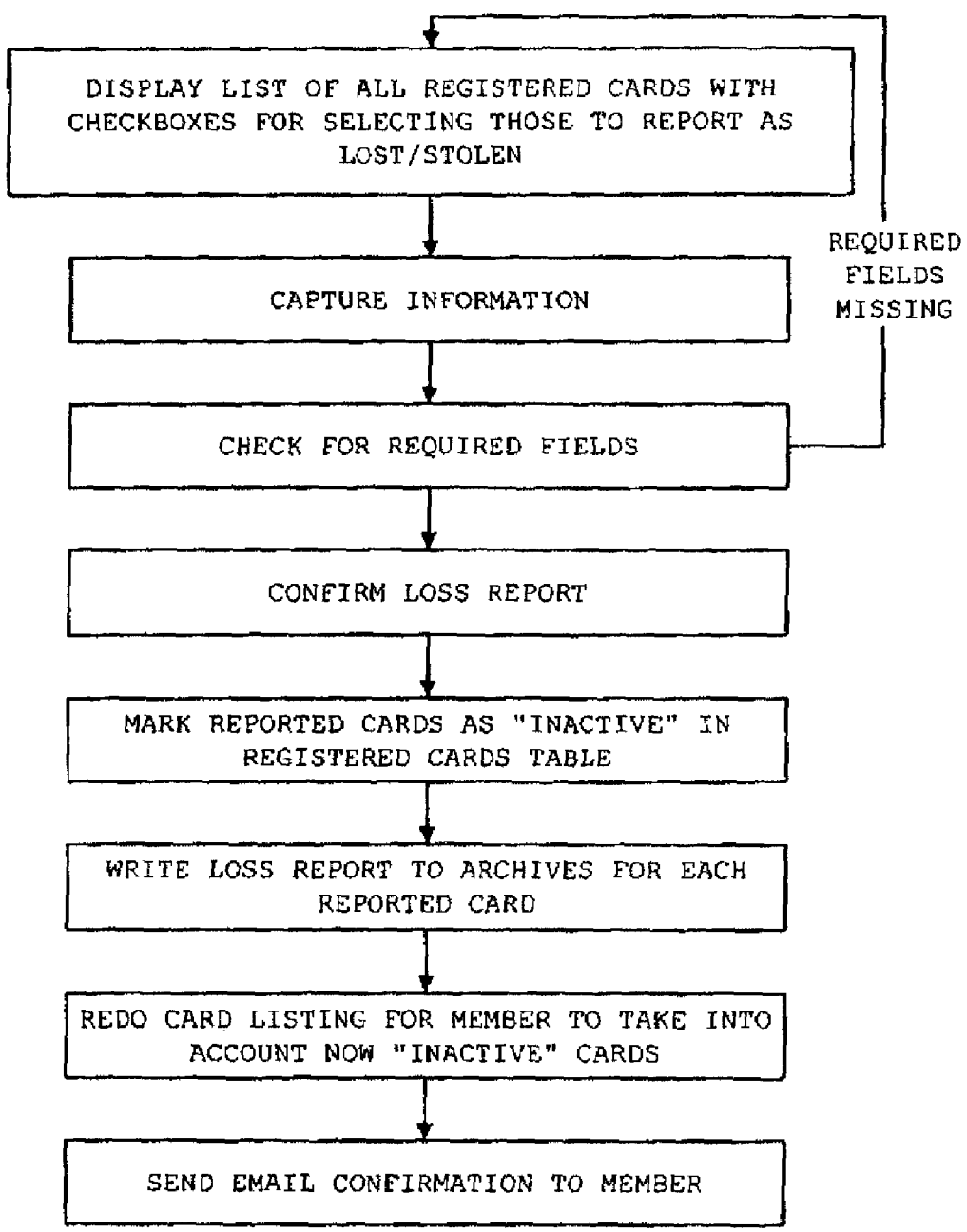
FIG. 22 is a flow chart for a computer program for "reporting lost cards" services.
Figure 23:
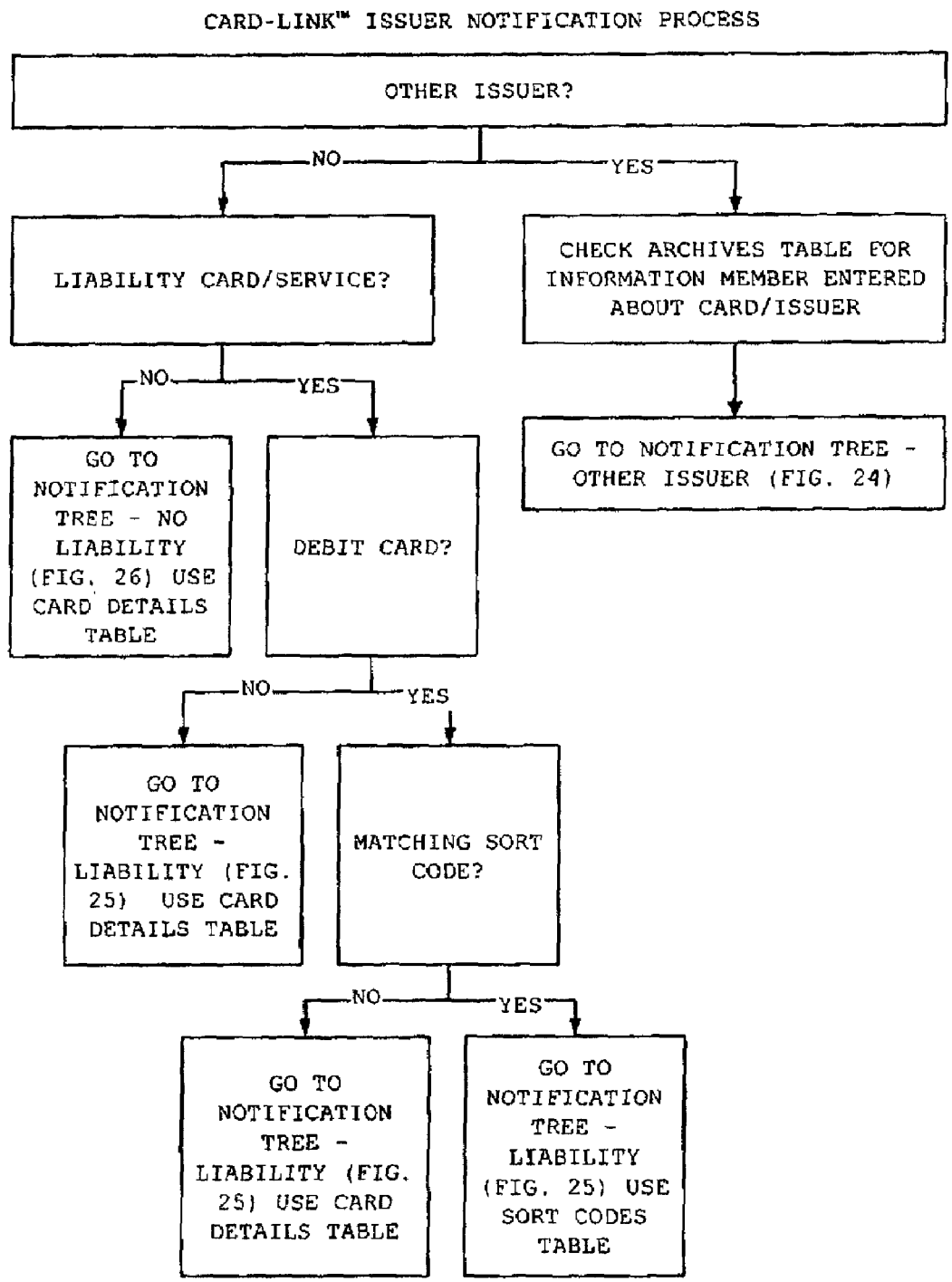
FIG. 23 is the flow chart for a computer program for "reporting lost cards to the card issuer.

The flow chart presented in FIG. 22 covers a computer program for recording and initial processing of the card holder report, with confirmation back to the individual. FIGS. 23-27 are flowcharts that determine how the card issuer is to be notified. If the card issuer is in the program directory, a determination is made as to whether the card user has liability (such as a credit card with can be fraudulently used). If there is no liability, the program moves to the flowchart in FIG. 26 and if liability attaches then the program moves to the flowchart in FIG. 25. In both cases all avenues of communication with the card issuer will be tried. If all attempts are unsuccessful, then an exception report (FIG. 27) is prepared for the Card Service Organization to "manually" handle.

Figure 24:
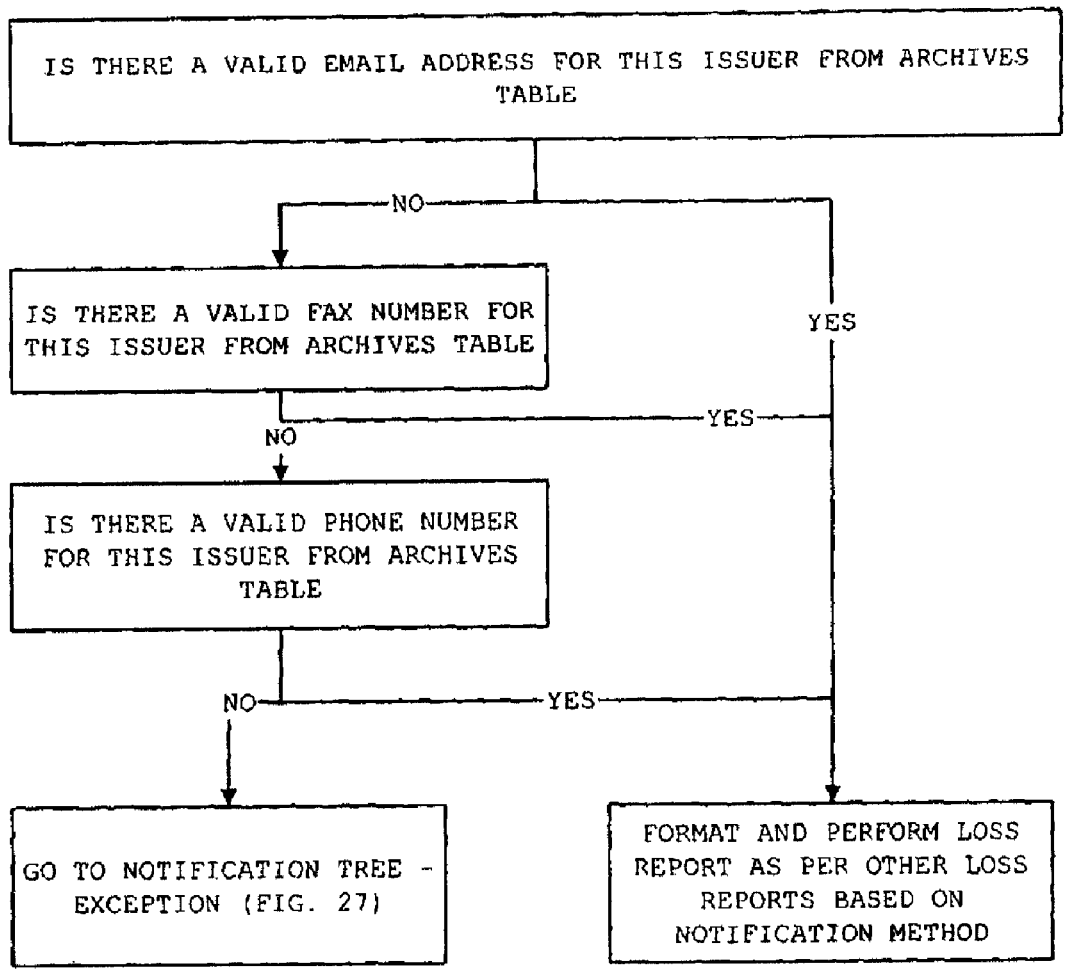
FIG. 24 is a continuation of the flow chart illustrated in FIG. 23.
Figure 25:
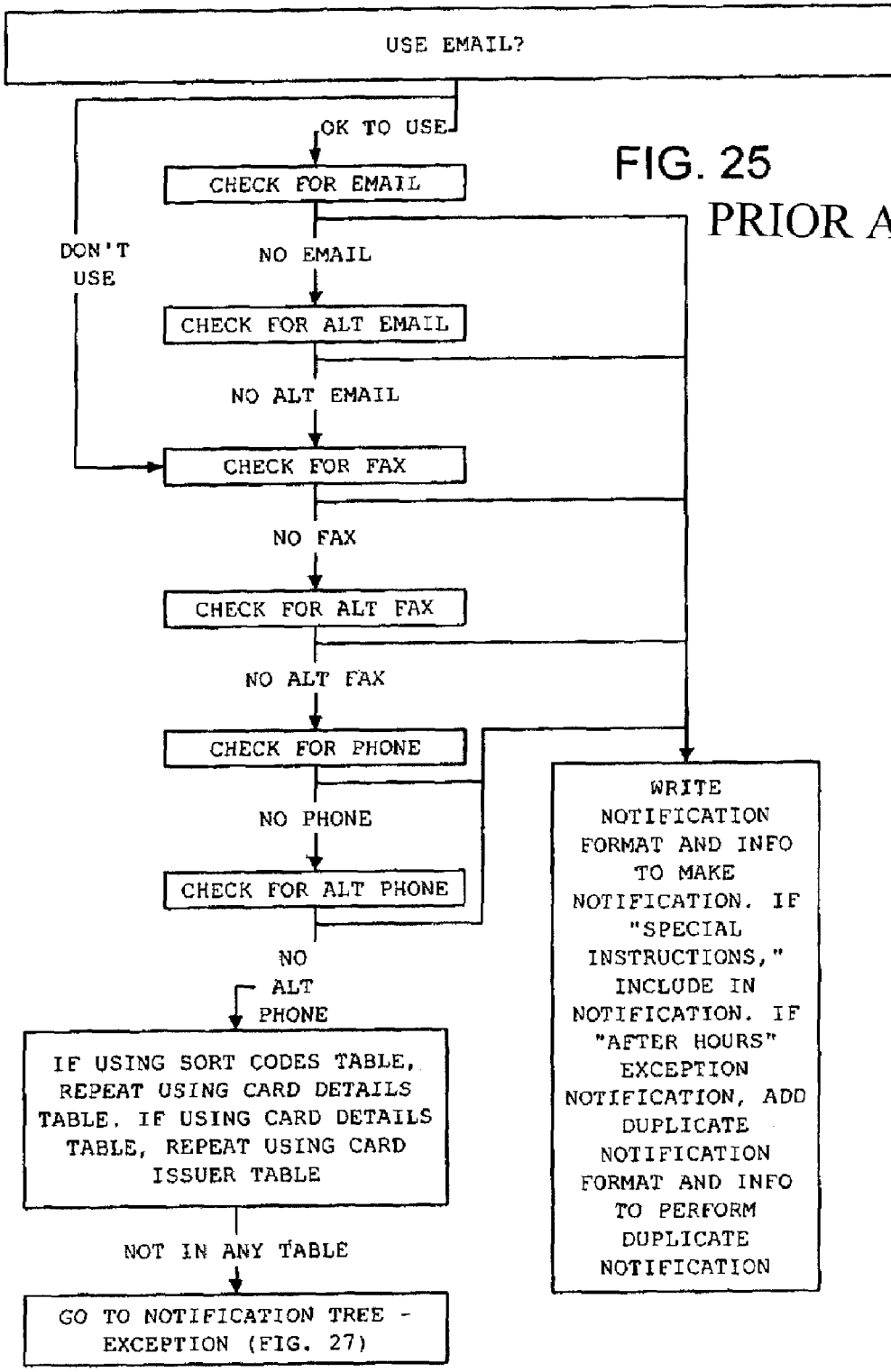
FIG. 25 is a continuation of the flow chart illustrated in FIG. 23.
Figure 26:
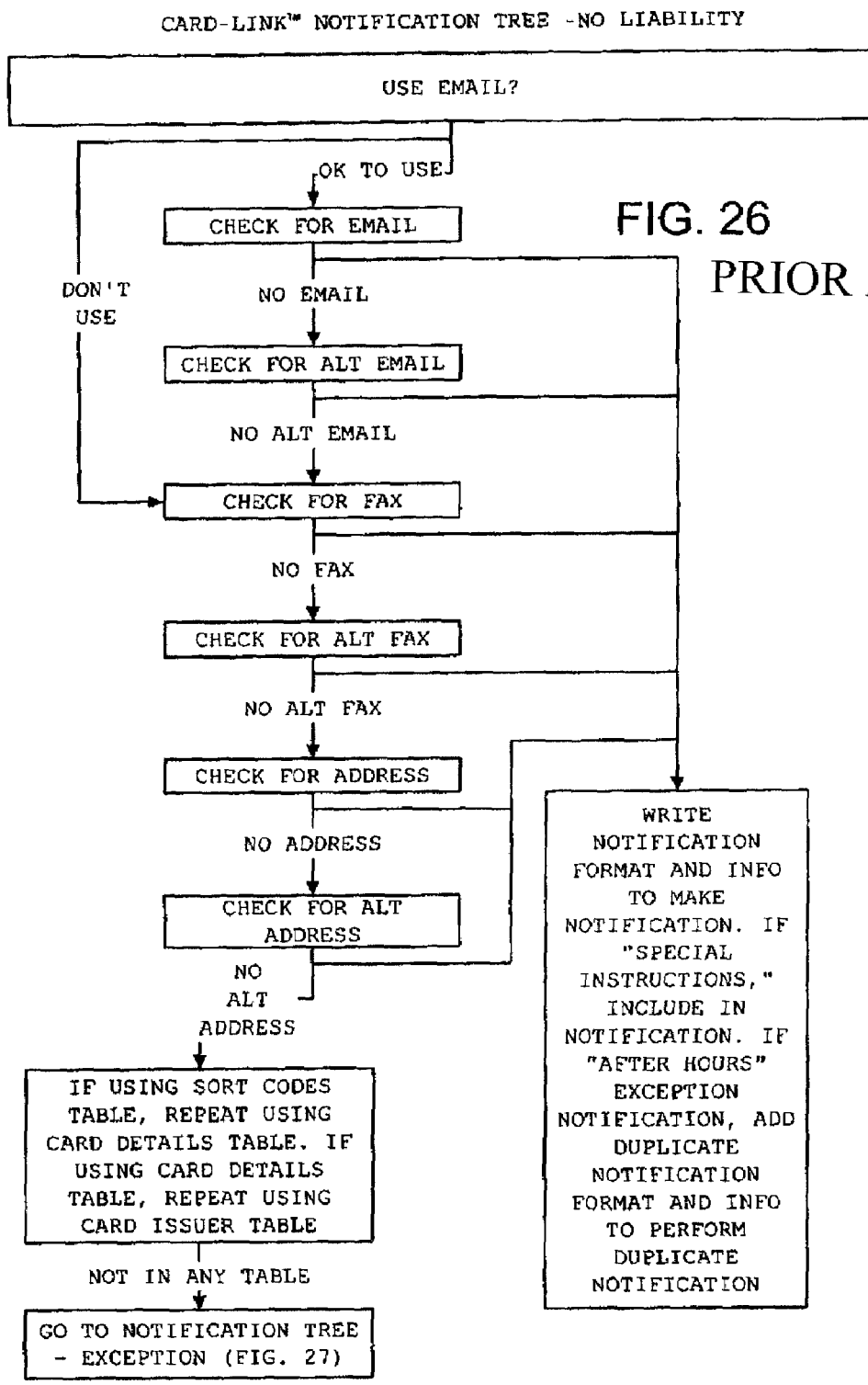
FIG. 26 is a continuation of the flow chart illustrated in FIG. 23.
Figure 28:
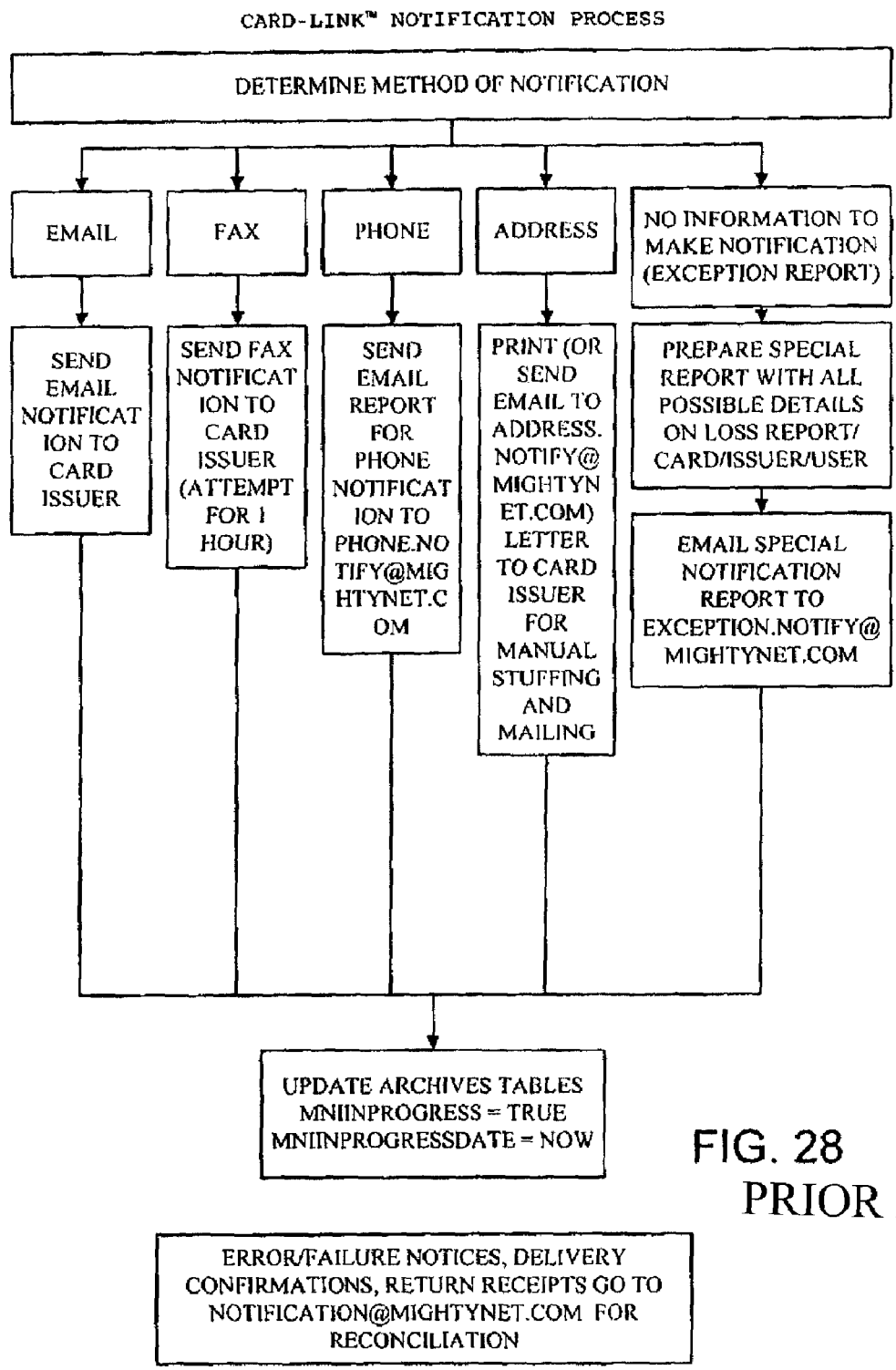
FIG. 28 is a flow chart of the card management organization "monitoring procedure for insuring lost cards are reported to the issuer."

Referring back to FIG. 23, if the card is from an "other issue", or in other words not in the program directory, then the program transfers to the program set forth in the flowchart in FIG. 24. Again, if automated contact can not be made, then an exception report (FIG. 27) is prepared for the Card Service Organization to "manually" handle. In FIG. 28, a flow chart is presented wherein the Card Management Organization personnel can monitor the progress of the reporting lost cards to the card issuer.

In all cases, the individual receives an e-mail confirmation, and periodic e-mail reminders to update their card list. In addition, the service is archived for a minimum of two years.

Figure 30:
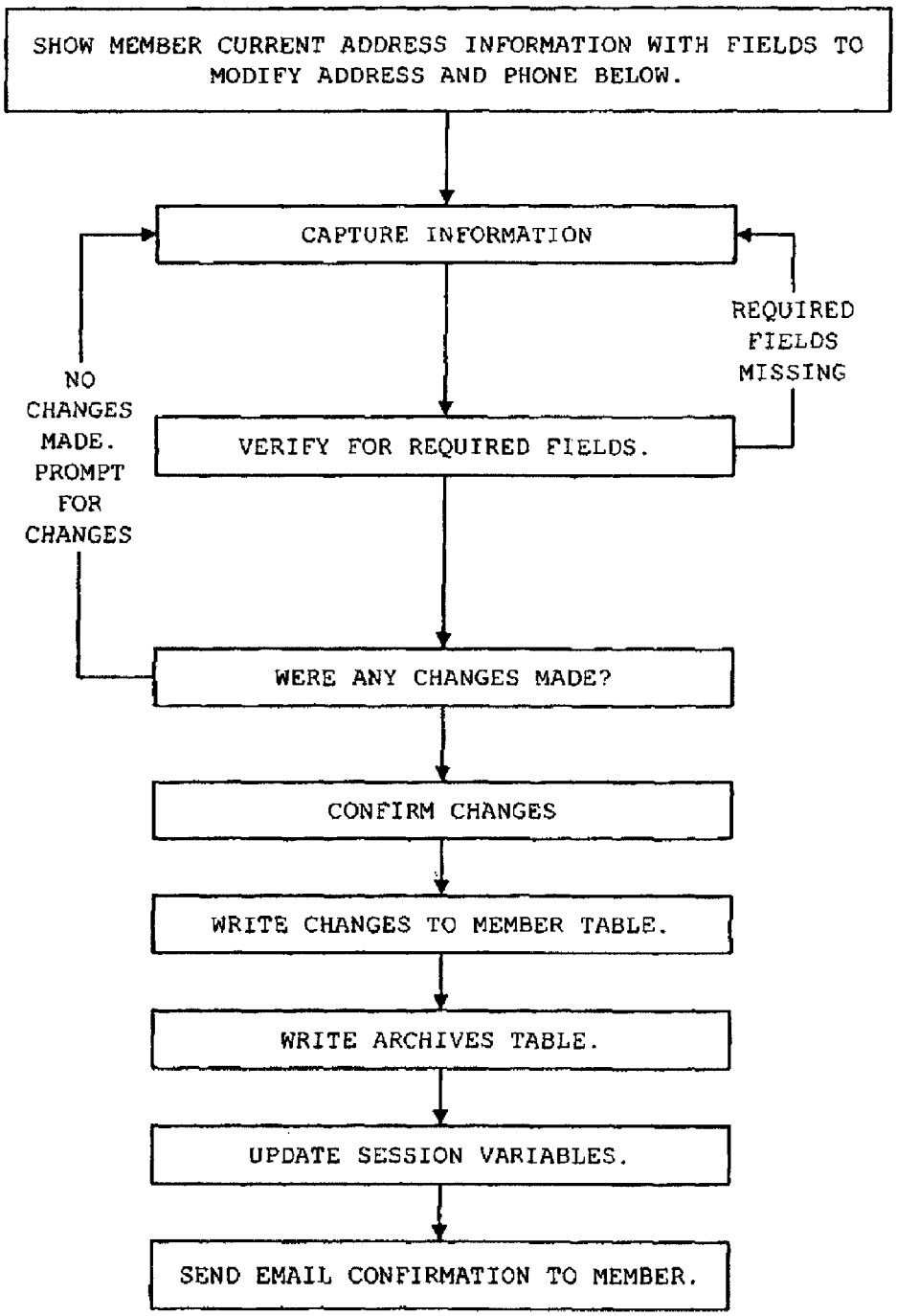
FIG. 30 is a flow chart for a computer program for "making an address change" services.

Referring to FIG. 8 and to FIG. 29, which discloses a Change of Address Menu screen and FIG. 30, which is the flow chart for the computer program to achieve a change of address, the individual is prompted to provide the new address, and indicate if all issuers are to be notified. Notification is made via e-mail, fax or letter, if applicable. The individual receives an e-mail confirmation and periodic e-mail reminders to update the card list. The service is archived for a minimum of two years.

Figure 32:
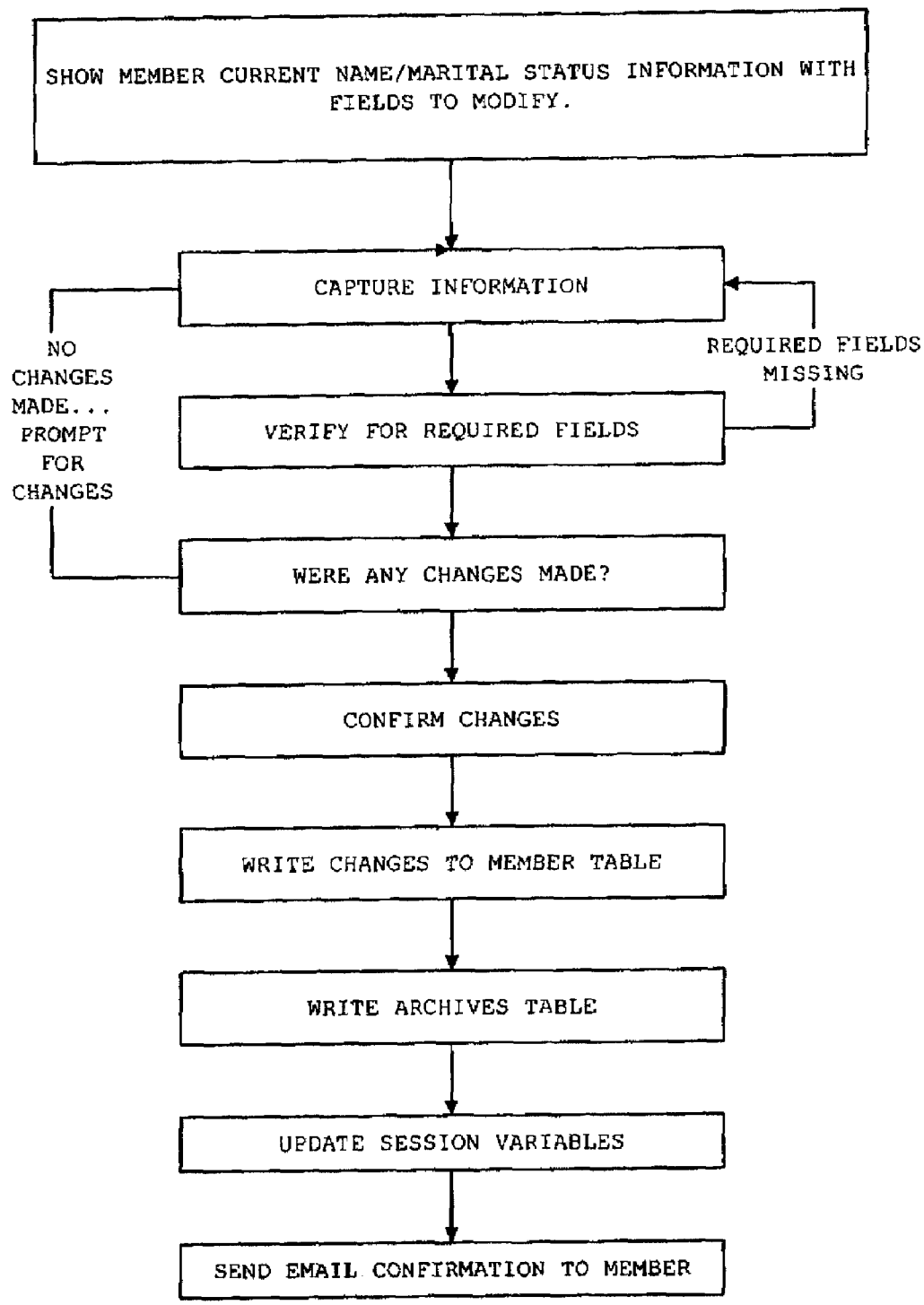
FIG. 32 is the flow chart for a computer program for making a "name or marital status change" services.

The individual user can request a name change or change in marital status. Again referring to FIG. 8 and, additionally to FIG. 31 which is a screen that prompts the individual to select the change and FIG. 32 which is the flow chart for the computer program thereto, the individual can indicate the changes and can provide details. Notifications are made via e-mail, fax or letter and the individual receives an e-mail confirmation and periodic e-mail reminders to update card list. The service is archived for a minimum of two years.

The individual user can request that a card issuer increase the credit amount. Again referring to FIG. 8 and, additionally to FIG. 33, which is a screen for prompting the individual to select the card and FIG. 34, the flow chart for the computer program thereto, the individual is prompted to select the card for which a credit increase is desired. Notifications are made via e-mail, fax or letter and the individual receives an e-mail confirmation and periodic e-mail reminders to update card list. The service is archived for a minimum of two years.

Figure 34:
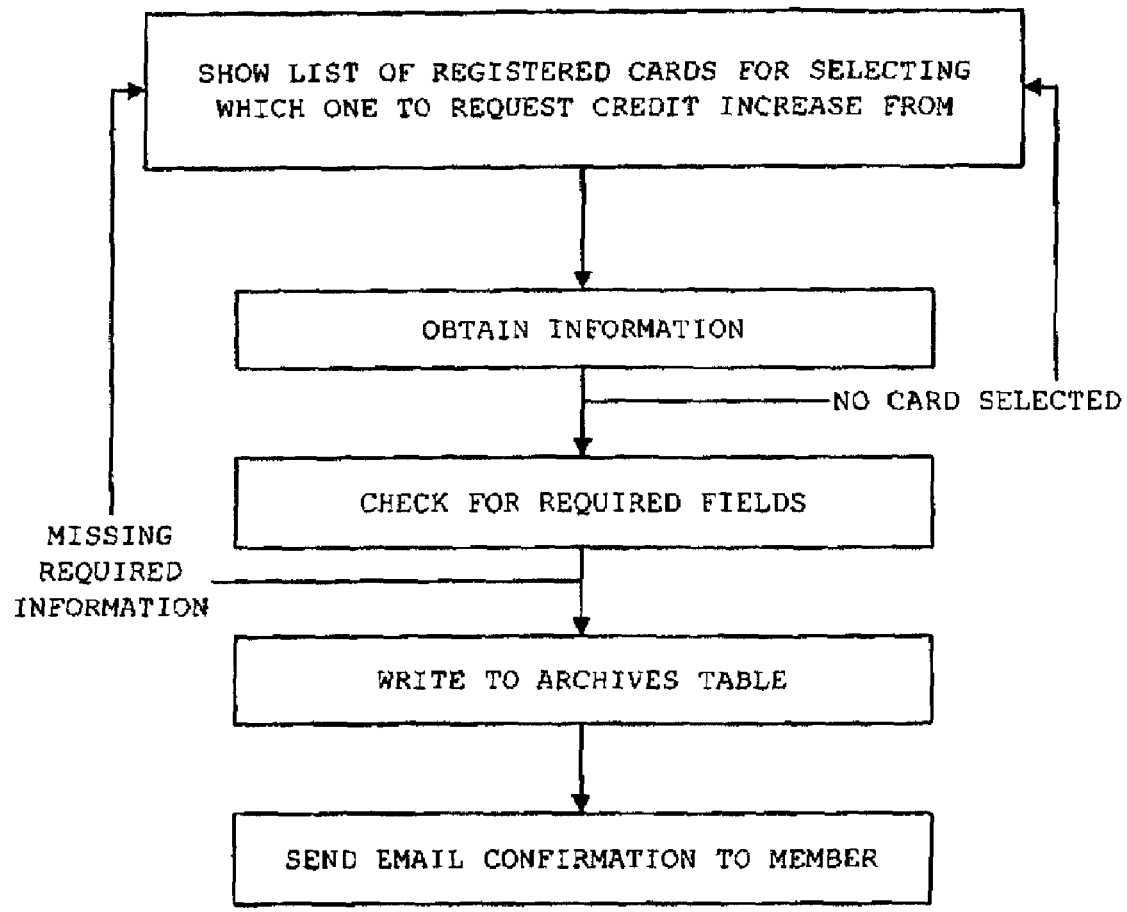
FIG. 34 is the flow chart for a computer program for "requesting a credit increase" services.

From the Member services menu (FIG. 8) the individual user can notify the card issuer of a credit card charge dispute. Referring to FIG. 34, which is a screen that allows the individual to select the card, and to FIG. 35, which is a flow chart for the associated computer program thereto, the individual selects the card whose billing is in dispute and provides information on the particular charge in dispute. The card issuer is notified and the individual is informed by e-mail when the card issuer is notified. The service is archived for a minimum of two years.

Figure 37:
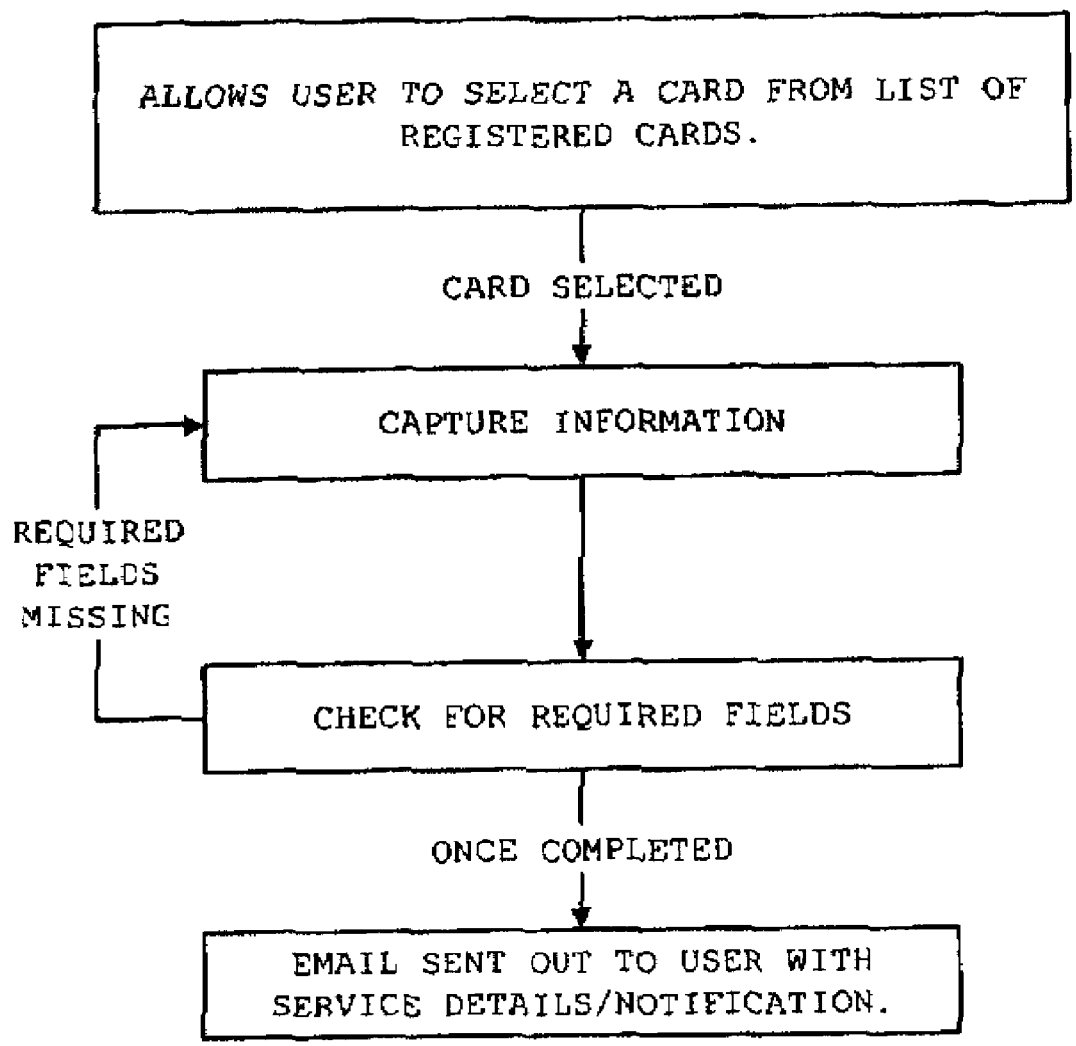
FIG. 37 is the flow chart for a computer program for "reporting a charge dispute made on a credit card" and "ordering a copy of a statement" services.

Still referring to FIG. 8, the individual can bring up a record of all transactions over any given period of time up to two years and request a copy thereof. The screen is illustrated in FIG. 36 while the flow chart for the associated computer program is provided in FIG. 37.

In accordance with a further aspect of the present invention, the card management system includes a telephonic user interface, which allows a user to communicate with the card management system via telephone 62 rather than via the computer network. In a preferred alternative embodiment, the telephonic user interface includes a conventional voice recognition/response system 63, as illustrated in FIG. 1. The telephonic user interface allows a user to use their voice and/or telephone keypad to select card management services and input data to the card management system. Instructions and confirmation information is output aurally to the user through the telephone speaker. All of the services accessible via the computer network are also accessible via the telephonic user interface. This allows a user to use the card management system when access to the computer network is unavailable or inconvenient (e.g., when traveling without a laptop computer).

While the above invention disclosed in U.S. patent application Ser. No. 09/846,616 entitled Card Management System and Method Therefore by S. Kasower, filed May 1, 2001, provides complete card management services, it required that the individual user manually enter all the credit card information, i.e., credit card number, card issuer organization, etc. The purpose of the subject invention is to provide for automatic entering of the necessary credit card information. After registering as a member by the process described above, the Register/Edit Cards Screen, illustrated in FIG. 15, is brought up and the individual user can click on Auto Registration Of Cards button, indicated by numeral 70. This will start a process wherein the individual user's cards are automatically registered.

Figure 38:
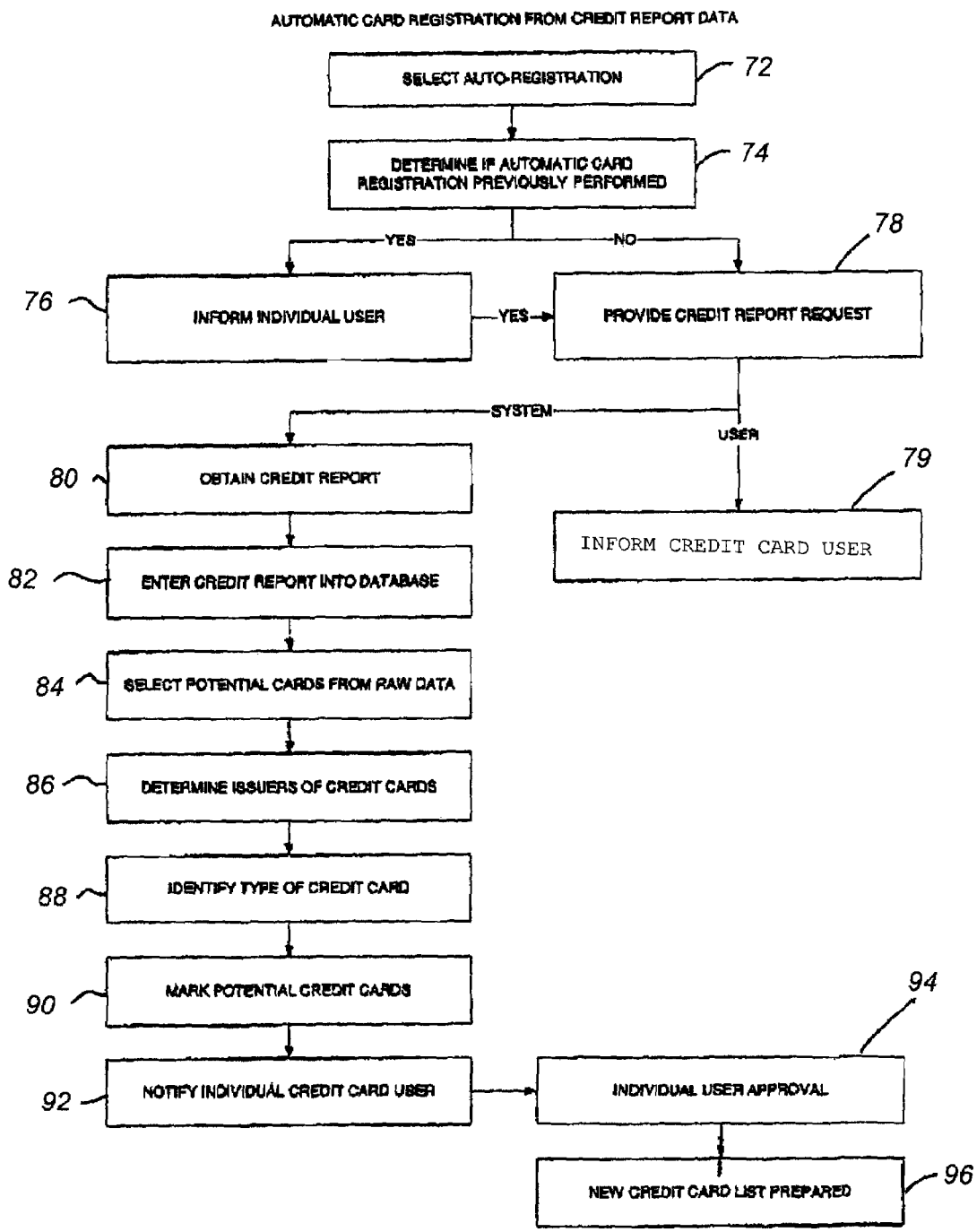
FIG. 38 is a flow chart of the method of automatically registering credit cards with the card management system.

Referring now to FIG. 38, the method involves the following steps.

Step 72—Select Auto-Registration. Selecting Button 70 on the Register/Edit Screen (FIG. 15).

Step 74—Determine if Automatic Card Registration Previously Performed. For example, if the individual user has previously requested Automatic Card Registration with the last few days, there is probably no reason to again request such action so soon. Thus the screen illustrated in FIG. 39 appears. If the individual user selects NO, the process continues to Step 78. If YES, it continues to Step 76.

Step 76—Inform Individual User. At this point the screen as illustrated in FIG. 40 appears. If the user does not wish to continue, he or she selects NO and the process ends. If YES is selected, the program continues to Step 78.

Step 78—Provide Credit Report Request. A screen, FIG. 41, will appear, which the user will fill out in order to allow the credit card management organization to obtain the credit report.

Step 79—Inform Credit Card User. The individual credit card user is then informed that he or she will be informed by e-mail within a specified time, typically 15 minutes.

Step 80—Obtain Credit Report. Here the credit report is obtained from the credit reporting bureau via the internet. This process is disclosed in U.S. patent application Ser. No. 10/665,244 entitled Method of On-Line Credit Information Monitoring and Control by S. Kasower, filed Sep. 20, 2003 and is herein incorporated by reference. This invention allows the credit card management to obtain a copy of the individual user's credit history, which will list all the credit cards.

Step 82—Enter Credit Report into Database. The raw credit report data is parsed into the database.

Step 84—Select potential credit cards from raw data. This step involves the culling of credit card type trade lines from the raw data and marking them as potential credit cards to be automatically registered.

Step 86—Determine Issuers Of Credit Cards. Individual credit reporting bureaus have their own short hand notation for the issuer of the cards. For example, a Capital One credit card may be listed by one credit bureau as "Capone", while another bureau may use "Capital 1." Considering the large number of credit card issuers, the number of possible "aliases" is numerous. However, there are only a few widely used bureaus, so comparing aliases is not too difficult.

Step 88—Identify type of credit card. It is somewhat of the same problem as in Step 86, but again manageable.

Step 90—Mark Potential Credit Cards. The potential credit cards are sorted into 3 categories: (a) fully identified and automatically registered issuer and credit card; (b) partially automatically registered, only issuer known; and (c) automatically registered, but no match to either a credit card issuer or credit card.

Step 92—Notify Individual Credit Card User. The individual user is notified by e-mail that the results are available. The screen for notification is illustrated in FIG. 42. This screen directs the user to go to Register/Edit Cards screen (FIG. 15).

Step 94—Individual User Approval. The individual user pulls up the Register/Edit Cards screen and presses the edit button and thereafter edits the list of newly automatically registered cards, as well as cards that were not tied to existing card issuers for editing and approval by the individual user.

Step 96—New credit card list prepared. Show user newly, automatically registered cards as well as cards that were unable to be matched to existing card issuers for editing and "approval" by the card user.

Thus it can be seen that the automatic registration of credit cards can be easily accomplished with minimum effort on the part of the individual card user. This is particularly important to individuals that have a large number of credit cards.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the Internet business industry as well as the credit card industry.

The invention claimed is:

1. A method of registering a card user's card information with a card management organization, the method comprising the steps of:

a card management organization's computer requesting a card user's credit report from a credit reporting bureau;

a card management organization's computer receiving the card user's credit report having real-time card information for one or more of the user's cards from the credit reporting bureau;

the card management organization's computer extracting the real-time card information for each card from the card user's credit report;

the card management organization's computer automatically marking selected credit card type trade lines from the real-time card information as potential cards to be automatically registered in the card management organization's computer;

the card management organization's computer automatically and in real-time fully or partially registering the potential cards;

the card management organization's computer generating and presenting a user interface having the real-time card information for each of the potential cards that were fully or partially registered after receiving the card user's credit report;

the card management organization's computer requesting the card user to verify the accuracy of the card user's real-time card information; and the card management organization's computer storing the card user's verified real-time card information in the card management organization's computer when verification of the accuracy of the card user's real time card information is received from the card user.

2. The method as set forth in claim 1 further comprising: the card management organization's computer establishing a credit card issuer for each card from the card user's credit report by using a database within the card management organization's computer, the database having known aliases of a plurality of credit card issuers.

3. The method as set forth in claim 1 comprising the additional steps of:

the card management organization's computer providing a user interface presenting at least one of a plurality of card management services provided by the card management organization and selectable by the card user; and the card management organization's computer storing data input by the card user associated with the selected card management service into a database connected to the card management's computer system.

4. The method as set forth in claim 3, wherein said plurality of card management services includes services selected from the group consisting of: reporting a lost or stolen card, registering a new card wherein the card user inputs associated new card data, a change of address, a request for a new card, notification of a billing dispute, a request for a copy of a bill, a change in marital status; and a change in name and a request for an increase in credit line.

5. The method as set forth in claim 1, wherein registering the potential cards includes, for each potential card, at least one of: inputting associated card data into a database connected to the card management's computer system, inputting change of address information into the database, inputting reporting lost or stolen credit card information into the database, inputting request for a new card information into the database, inputting notification of a billing dispute information into the database, inputting request for a copy of a bill information into the database, inputting request for a change in marital status or name change information into the database, inputting increase in credit line information into the database, storing a record of the associated data in the database, and providing a confirmation that the issuing organization has been contacted and provided the associated card data.

6. The method as set forth in claim 1, further comprising parsing the real-time card information into a database connected to the card management's computer system.

7. The method as set forth in claim 1, further comprising determining a credit card issuer from the real-time card information using the card management organization's database of known card issuer aliases.

8. The method as set forth in claim 1, further comprising automatically and in real-time fully or partially registering the potential cards according to one of the following conditions: (a) if the card issuer and its respective card are fully identified; (b) if only the card issuer of a respective card is known; or (c) if either the card issuer or its respective card do not match.

* * * * *